US008839240B2

(12) United States Patent
Barrett et al.

(10) Patent No.: US 8,839,240 B2
(45) Date of Patent: *Sep. 16, 2014

(54) ACCESSING VENDOR-SPECIFIC DRIVERS FOR CONFIGURING AND ACCESSING A SELF-VIRTUALIZING INPUT/OUTPUT DEVICE

(75) Inventors: Patrick A. Barrett, Rochester, MN (US); Charles S. Graham, Rochester, MN (US); Andrew T. Koch, Rochester, MN (US); Bryan M. Logan, Rochester, MN (US); Kyle A. Lucke, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 592 days.

This patent is subject to a terminal disclaimer.

(21) Appl. No.: 12/955,698

(22) Filed: Nov. 29, 2010

(65) Prior Publication Data
US 2012/0137288 A1     May 31, 2012

(51) Int. Cl.
G06F 9/455     (2006.01)
G06F 9/46      (2006.01)
G06F 9/44      (2006.01)

(52) U.S. Cl.
CPC .................................. *G06F 9/45558* (2013.01)
USPC ....... 718/1; 718/100; 710/8; 710/10; 719/321

(58) Field of Classification Search
None
See application file for complete search history.

(56) References Cited

U.S. PATENT DOCUMENTS

| 6,427,177 | B1* | 7/2002 | Chang ................................ 710/8 |
| 6,721,826 | B2 | 4/2004 | Hoglund |
| 6,725,284 | B2 | 4/2004 | Arndt |
| 6,877,158 | B1 | 4/2005 | Arndt |
| 7,207,041 | B2 | 4/2007 | Elson et al. |
| 7,870,301 | B2 | 1/2011 | Arndt et al. |
| 8,086,903 | B2 | 12/2011 | Arndt et al. |
| 8,095,701 | B2 | 1/2012 | Tarui et al. |
| 8,141,092 | B2 | 3/2012 | Brown et al. |
| 8,141,093 | B2 | 3/2012 | Brown et al. |
| 8,156,253 | B2* | 4/2012 | Watanabe ......................... 710/8 |
| 8,219,988 | B2 | 7/2012 | Armstrong et al. |
| 8,219,989 | B2 | 7/2012 | Armstrong et al. |
| 8,473,947 | B2 | 6/2013 | Goggin et al. |
| 8,561,065 | B2* | 10/2013 | Cunningham et al. ............. 718/1 |
| 8,561,066 | B2* | 10/2013 | Koch et al. ........................ 718/1 |
| 8,645,974 | B2* | 2/2014 | Armstrong et al. ........... 719/321 |
| 2001/0037301 | A1* | 11/2001 | Shepley et al. .................. 705/43 |
| 2003/0204648 | A1 | 10/2003 | Arndt |
| 2006/0147235 | A1* | 7/2006 | Sadovsky et al. ............... 400/62 |

(Continued)

OTHER PUBLICATIONS

Direct Assignment for Virtualized I/O, Enabling I/O-Intensive Applications for Server Virtualization (2009).*

(Continued)

*Primary Examiner* — Emerson Puente
*Assistant Examiner* — Benjamin Wu
(74) *Attorney, Agent, or Firm* — Wood, Herron & Evans, LLP

(57) ABSTRACT

A vendor independent interface is provided between a hypervisor and an adjunct partition associated with a self-virtualizing IO resource to effectively abstract away vendor-specific interface details for the self-virtualizing IO resource and its adjunct partition. By doing so, vendor-specific implementation details may be isolated from the configuration and management functionality in a hypervisor, thus minimizing the changes to vendor specific firmware in order to manage new or revised self-virtualizing IO resources.

24 Claims, 9 Drawing Sheets

(56) References Cited

U.S. PATENT DOCUMENTS

| | | |
|---|---|---|
| 2006/0195634 A1 | 8/2006 | Arndt et al. |
| 2006/0195673 A1 | 8/2006 | Arndt et al. |
| 2006/0225073 A1* | 10/2006 | Akagawa et al. ................. 718/1 |
| 2007/0008887 A1* | 1/2007 | Gorbatov et al. ............. 370/230 |
| 2007/0050764 A1* | 3/2007 | Traut ................................ 718/1 |
| 2007/0220246 A1 | 9/2007 | Powell et al. |
| 2008/0082975 A1* | 4/2008 | Oney et al. ........................ 718/1 |
| 2008/0091855 A1 | 4/2008 | Moertl et al. |
| 2008/0189715 A1* | 8/2008 | Armstrong et al. ........... 718/104 |
| 2008/0276246 A1* | 11/2008 | Armstrong et al. ........... 718/104 |
| 2008/0301692 A1 | 12/2008 | Billau et al. |
| 2009/0037906 A1 | 2/2009 | Armstrong et al. |
| 2009/0037908 A1* | 2/2009 | Armstrong et al. ................ 718/1 |
| 2009/0037941 A1 | 2/2009 | Armstrong et al. |
| 2009/0049453 A1* | 2/2009 | Baran et al. .................... 719/313 |
| 2009/0144731 A1* | 6/2009 | Brown et al. ..................... 718/1 |
| 2009/0212104 A1* | 8/2009 | Smith et al. ................... 235/379 |
| 2009/0217275 A1 | 8/2009 | Krishnamurthy et al. |
| 2009/0248937 A1 | 10/2009 | Solomon et al. |
| 2009/0276605 A1 | 11/2009 | Arndt et al. |
| 2009/0276773 A1 | 11/2009 | Brown et al. |
| 2009/0313391 A1 | 12/2009 | Watanabe et al. |
| 2010/0014526 A1 | 1/2010 | Chavan et al. |
| 2010/0082874 A1 | 4/2010 | Baba et al. |
| 2010/0095310 A1 | 4/2010 | Oshins et al. |
| 2010/0180274 A1 | 7/2010 | Cherian et al. |
| 2010/0290473 A1 | 11/2010 | Enduri et al. |
| 2011/0239213 A1* | 9/2011 | Aswani et al. ..................... 718/1 |
| 2011/0289360 A1* | 11/2011 | Cathro ............................. 714/45 |
| 2012/0005521 A1 | 1/2012 | Droux et al. |
| 2012/0042034 A1* | 2/2012 | Goggin et al. ................ 709/216 |
| 2012/0124572 A1 | 5/2012 | Cunningham et al. |
| 2012/0137288 A1 | 5/2012 | Barrett et al. |
| 2012/0151472 A1 | 6/2012 | Koch et al. |
| 2012/0180048 A1 | 7/2012 | Brownlow et al. |
| 2012/0210044 A1 | 8/2012 | Armstrong et al. |

OTHER PUBLICATIONS

Raj et al. "High performance and scalable I/O virtualization via self-virtualized devices", Proceedings of the 16th international symposium on High perofmrance distributed computing, 2007, pp. 179-188.

U.S. Patent and Trademark Office, Office Action issued in related U.S. Appl. No. 12/946,316, dated Oct. 15, 2012.

U.S. Patent and Trademark Office, Final Office Action issued in related U.S. Appl. No. 12/946,316, dated Mar. 14, 2013.

U.S. Patent and Trademark Office, Office Action issued in related U.S. Appl. No. 12/963,256, dated Feb. 7, 2013.

U.S. Patent and Trademark Office, Office Action issued in related U.S. Appl. No. 12/963,300, dated Oct. 18, 2012.

U.S. Patent and Trademark Office, Final Office Action issued in related U.S. Appl. No. 12/963,300, dated Mar. 14, 2013.

U.S. Patent and Trademark Office, Notice of Allowance issued in related U.S. Appl. No. 12/946,316, dated Jun. 10, 2013.

U.S. Patent and Trademark Office, Final Office Action issued in related U.S. Appl. No. 12/963,256, dated Aug. 5, 2013.

U.S. Patent and Trademark Office, Notice of Allowance issued in related U.S. Appl. No. 12/963,300, dated Jun. 10, 2013.

U.S. Patent and Trademark Office, Notice of Allowance issued in related U.S. Appl. No. 12/963,256, dated Mar. 14, 2014.

U.S. Patent and Trademark Office, Office Action issued in related U.S. Appl. No. 13/109,289, dated Apr. 10, 2014.

\* cited by examiner

ACCESSING VENDOR-SPECIFIC DRIVERS FOR CONFIGURING AND ACCESSING A SELF-VIRTUALIZING INPUT/OUTPUT DEVICE

FIELD OF THE INVENTION

The invention is generally related to data processing, and in particular to logically partitioned data processing systems and self-virtualizing input/output devices for use with same.

BACKGROUND OF THE INVENTION

Modern requirements for a computer system may require that a computer be utilized to run several operating environments, or operating systems, at once. In a typical embodiment, a single logically partitioned computer or data processing system can run a plurality of operating systems in a corresponding plurality of logical partitions (LPARs), also referred to as virtual machines (VMs). Each operating system resides in its own LPAR, with each LPAR allocated a part of a physical processor, an entire physical processor, or multiple physical processors from the computer. Additionally, a portion of the computer's memory is allocated to each LPAR. An underlying partition manager, often referred to as a hypervisor or virtual machine monitor (VMM), manages and controls the LPARs. The hypervisor is typically a part of the system firmware and manages the allocation of resources to the operating systems and LPARs. As such, one logically partitioned computer may run one or more LPARs and thus virtualize the operations of the applications, operating systems, and other program code configured to operate in those logical partitions.

In addition to sharing the physical processors and memory in a logically partitioned computer, LPARs also typically share other types of physical hardware resources, which are collectively referred to herein as input/output (IO) resources. For example, in order to provide LPARs with access to external networks, logically partitioned computers typically include multiple physical network adapters, e.g., network interface cards (NICs), that are shared by the LPARs, such that each LPAR is allocated at least a part of one or more physical network adapters to enable that LPAR to access various networks, e.g., local area networks, wide area networks, storage networks, the Internet, etc. Many IO resources, including many network adapters, are compliant with various Peripheral Component Interconnect (PCI) standards. PCI-compliant IO resources typically implement one or more PCI functions, e.g., to support different protocols such as Ethernet, Fibre Channel over Ethernet (FCoE), etc.

Access to IO resources in both logically partitioned and non-partitioned computers is typically handled at the operating system level through the use of device drivers. Device drivers typically provide a common interface to the operating system and the applications executing thereon to effectively hide the implementation details of a particular hardware device from these higher software layers. High level commands from these higher software layers are typically translated to device-specific commands that are appropriate for the particular make and model of the underlying IO resource. Therefore, so long as different device drivers from different vendors of a particular type of IO resource provide the same common interface to the operating system and applications, the operating system and applications can access the IO resource using the same commands and without concern for the particular make and model of the IO resource.

In many conventional logically partitioned computers, IO resources are virtualized within the hypervisor, so that conventional device drivers, appropriate for use in both logically partitioned and non-partitioned computers, may be used. Virtualization of an IO resource in a hypervisor typically requires that the hypervisor trap device accesses by the device drivers in the LPARs and effectively route the operations to the appropriate physical IO resources. Thus, where multiple LPARs share a common physical IO resource, the hypervisor itself handles the multiplexing of operations performed by the physical IO resource on behalf of each LPAR. Allocating such higher-level functionality to a hypervisor, however, has been found to introduce excessive complexity and processing overhead to the hypervisor. It is desirable in many implementations for a hypervisor to be as small, compact, fast and secure as possible so that the processing overhead of the hypervisor is minimized. As such, other technologies have been introduced in an attempt to off-load the responsibility of virtualizing IO resources from the hypervisor.

For example, in some designs, a dedicated LPAR, referred to as a virtual input/output server (VIOS), may be used to manage the virtualization of IO resources. While the use of a VIOS offloads higher-level functions from the hypervisor and reduces the overall complexity of the hypervisor, it has been found that using LPARs to provide such services to other LPARs requires relatively high overhead to instantiate and run the LPAR, and thus, a full operating system, in order to provide such services.

More recently, some designs have relied upon adjunct partitions (APs), which have also been referred to as partition adjuncts, to assist with the virtualization of IO resources. An AP is a type of partition that is more limited than a full, logical partition. An AP typically runs in a flat, static effective address space and problem state, which permits the hypervisor to apply a range of hypervisor and processor optimizations that result in a substantial decrease in system overhead associated with a context switch of the state machine from an LPAR to state data of an AP, that is, compared to a context switch of the state machine between two LPARs. In other respects, an AP is similar to a full LPAR. For example, an AP typically can be assigned resources, either physical or virtual, similar to a full LPAR. Further, an AP can be an end-point of a virtual input output (VIO) communications mechanism, similar to a full LPAR, such as VIOS.

In addition, some designs have incorporated the concept of self-virtualization of IO resources, where at least a portion of the virtualization of a physical IO resource is handled within the resource itself. The PCI single root input/output virtualization (SRIOV) specification, for example, enables a physical IO resource such as a NIC to incorporate replicated on-board functionality such as memory spaces, work queues, interrupts, and command processing so that a single function such as a single Ethernet connection can be presented to a logically partitioned computer as multiple and separate physical functions. The SRIOV specification introduces the concepts of physical functions (PFs) and virtual functions (VFs), with the former representing full PCI functions and having the ability to instantiate, configure and manage VFs, and the latter representing lightweight PCI functions with reduced configuration resources and usable by LPARs to access a self-virtualizing device.

It has been found that the use of APs in conjunction with self-virtualizing IO resources provides a flexible, efficient framework with which to virtualize IO resources in a logically partitioned computer, and does so without requiring a separate full LPAR to provide the virtualization, and without requiring such functionality to be embedded within client LPARs or in the hypervisor.

Some inefficiencies nonetheless exist in logically-partitioned computers that utilize APs to manage self-virtualizing IO resources. For example, it has been found that the programming interfaces of self-virtualizing IO resources such as SRIOV Ethernet adapters can vary widely from vendor to vendor. As a result, configuring and managing such resources, as well as the adjunct partitions associated therewith, often requires a significant amount of development effort in order to support each different vendor's adapter.

A need therefore exists in the art for a manner of reducing the development effort required to support configure and manage a self-virtualizing IO resource in a logically partitioned computer.

SUMMARY OF THE INVENTION

The invention addresses these and other problems associated with the prior art by providing a vendor independent interface between a hypervisor and an adjunct partition associated with a self-virtualizing IO resource to effectively abstract away vendor-specific interface details for the self-virtualizing IO resource and its adjunct partition. By doing so, vendor-specific implementation details may be isolated from the configuration and management functionality in a hypervisor, thus minimizing the changes to vendor specific firmware in order to manage new or revised self-virtualizing IO resources.

Therefore, consistent with one aspect of the invention, a self-virtualizing input/output (IO) resource may be managed in a logically partitioned data processing system by interfacing an adjunct partition associated with the self-virtualizing input/output (IO) resource with a hypervisor through a vendor-independent Adjunct Management Channel (AMC) interface, where the adjunct partition includes a partition AMC device driver and the hypervisor includes a hypervisor AMC device driver configured to interface with the partition AMC device driver over the AMC interface. In addition, the adjunct partition is managed in the hypervisor by communicating a configuration command from the hypervisor to vendor-specific adjunct management program code in the adjunct partition over the AMC interface using the partition and hypervisor AMC device drivers.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Embodiments consistent with the invention utilize a vendor independent interface between a hypervisor and an adjunct partition associated with a self-virtualizing IO resource to effectively abstract away vendor-specific interface details for the self-virtualizing IO resource in connection with configuring and managing that resource and the adjunct partitions associated therewith. By doing so, vendor-specific implementation details may be isolated from the hypervisor configuration and management functionality, thus minimizing the changes required to support new or revised self-virtualizing IO resources.

In embodiments consistent with the invention, a hypervisor is interfaced with adjunct partitions associated with a self-virtualizing IO resource such as an SRIOV network adapter through an adjunct management channel (AMC) interface that provides a vendor-independent virtual configuration interface with the adjunct partitions. To provide such an interface, both the hypervisor and the adjunct partitions incorporate paired adjunct management channel device drivers configured to interface with one another over the adjunct management channel. Vendor-specific implementation details of a particular make and model of self-virtualizing IO resource are then abstracted from the management and configuration functionality in a hypervisor. In addition, in some embodiments, an adjunct partition may also include a device driver application programming interface (API) that interfaces the adjunct management channel device driver with a device driver for the adjunction partition, e.g., to permit the hypervisor to configure and manage the underlying self-virtualizing IO resource.

Other variations and modifications will be apparent to one of ordinary skill in the art. Therefore, the invention is not limited to the specific implementations discussed herein.

Hardware and Software Environment

Figure 1:
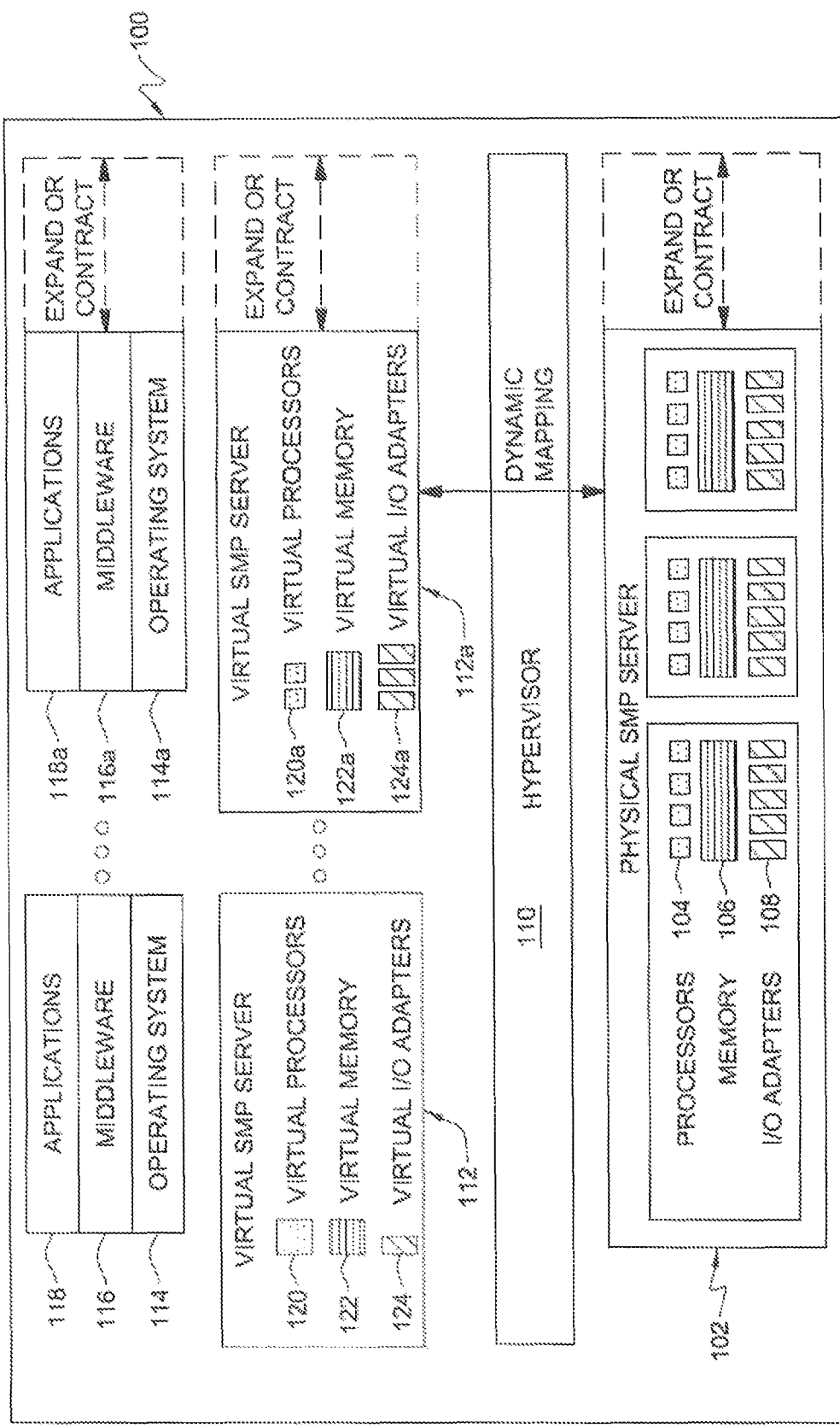
FIG. 1 is a block diagram of one embodiment of a data processing system configured to implement one or more aspects of the present invention.

Now turning to the Drawings, wherein like numbers denote like parts throughout the several views, FIG. 1 is a block diagram of a data processing system or computer 100, which in one example is a symmetric multiprocessing (SMP) server computer system. SMP server computer system 100 includes physical hardware devices that can be mapped to, i.e., temporarily owned by, a user application to execute that application.

SMP server computer system 100 includes a physical SMP server 102. Physical SMP server 102 includes physical hardware devices such as processors 104, memory 106, and I/O adapters 108. These physical devices are managed by hypervisor 110, which may also be referred to as a partition manager, virtual machine monitor or PHYP. Processors 104 are shared processors and each may be a simultaneous multithreading (SMT)-capable processor that is capable of concurrently executing multiple different threads on the processor.

A virtual server, or logical partition, is a proxy for a physical server that has the same capabilities, interfaces, and state. Virtual servers 112 are created and managed by a hypervisor 110 that resides on physical SMP server computer system 100. A virtual server appears to be a physical SMP server to its user: the operating system, middleware, and application software that run upon it. SMP server computer system 100 includes one or more virtual servers such as virtual server 112 and virtual server 112a.

Each virtual server appears to its software to include its own processor(s), memory, and I/O adapter(s) that are available for the exclusive use of that virtual server. For example, virtual server 112 includes virtual processors 120, virtual memory 122, and virtual I/O adapters 124. Virtual server 112a includes virtual processors 120a, virtual memory 122a, and virtual I/O adapters 124a.

Each virtual server supports its own software environment, including an operating system, middleware, and applications. The software environment of each virtual server can be different from the software environment of other virtual servers. For example, the operating systems executed by each virtual server may differ from one another.

For example, virtual server 112 supports operating system 114, middleware 116, and applications 118. Virtual server 112a supports operating system 114a, middleware 116a, and applications 118a. Operating systems 114 and 114a may be the same or different operating systems.

A virtual server is a logical description of a server that defines a server environment that acts, to a user, as if it were a physical server, being accessed and providing information in the same way as a physical server. The virtual processors, virtual memory, and virtual I/O adapters that are defined for each virtual server are logical substitutes for physical processors, memory, and I/O adapters.

Hypervisor 110 manages the mapping between the virtual servers with their virtual processors, virtual memory, and virtual I/O adapters and the physical hardware devices that are selected to implement these virtual devices. For example, when a virtual processor is dispatched, a physical processor, such as one of physical processors 104, is selected by hypervisor 110 to be used to execute and implement that virtual processor. Hypervisor 110 manages the selections of physical devices and their temporary assignment to virtual devices.

Hypervisor 110 services all of the virtual servers or logical partitions during a dispatch time slice. The dispatch time slice is a particular length of time. During each dispatch time slice, hypervisor 110 will allocate, or assign, the physical processor to each logical partition. When the logical partition has been allocated time on the physical processor, the virtual processors defined by that logical partition will be executed by the physical processor.

Hypervisor 110 is responsible for dynamically creating, managing, and destroying virtual SMP servers. Whole virtual processors, virtual I/O adapters, and virtual memory blocks can be removed or added by hypervisor 110. Hypervisor 110 is also responsible for dynamic resource allocation, managing time-sharing of physical resources, and altering the physical resource mapped to a processor without involving the operating system. Hypervisor 110 is also able to dedicate physical resources to virtual resources for situations where sharing is not desired. Hypervisor 110 is responsible for managing the addition or removal of physical resources. Hypervisor 110 makes these additions and deletions transparent to the upper level applications.

Figure 2:
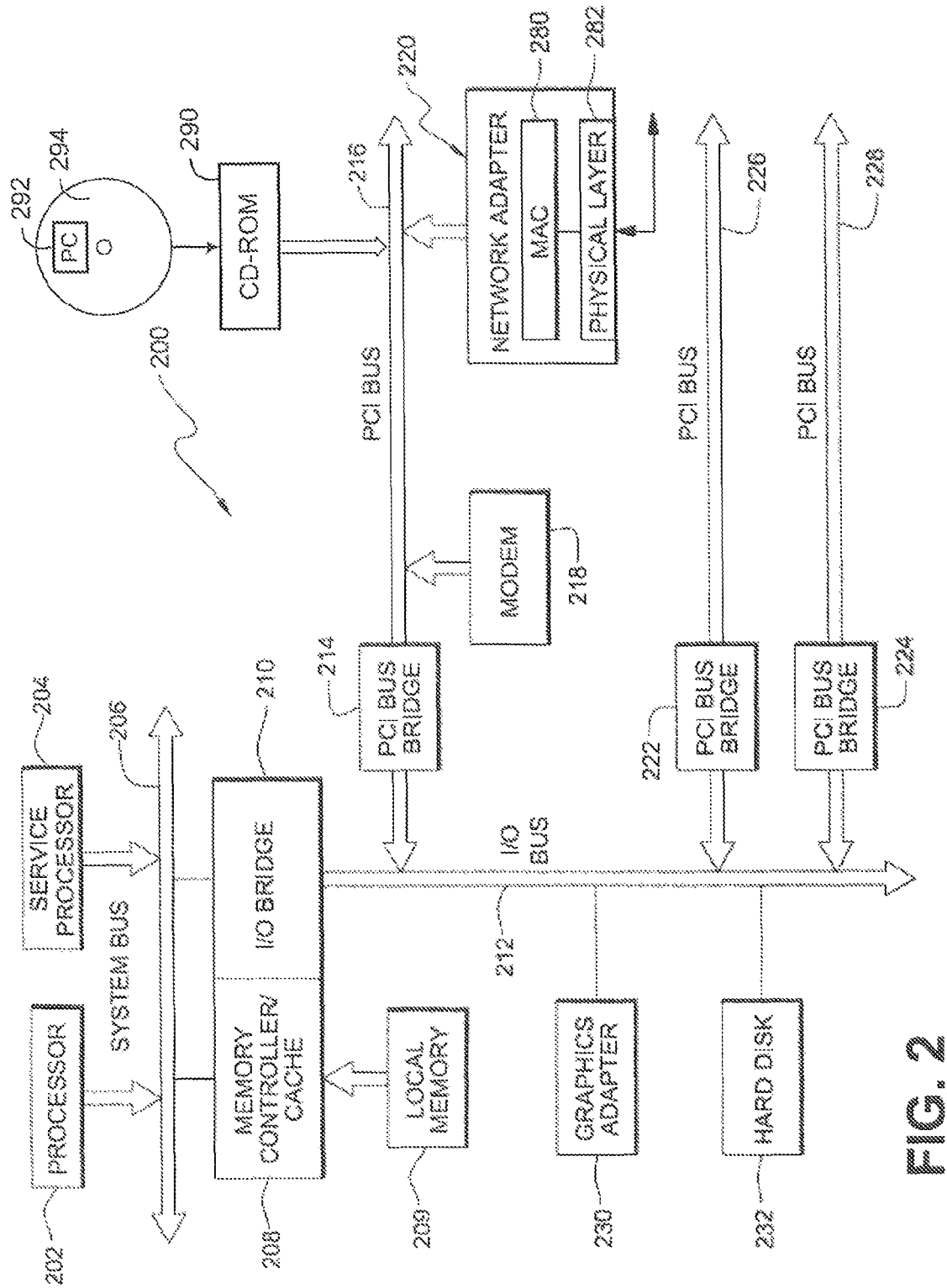
FIG. 2 is a more detailed illustration of a data processing system that may be used to implement one or more aspects of the present invention.

FIG. 2 is a more detailed illustration of a computer system that may be used to implement the concepts described herein. Data processing system 200 may be a symmetric multiprocessor (SMP) system including a plurality of shared processors or SMT-capable processors, such as processors 202 and 204 connected to system bus 206. Alternatively, a single processor system may be employed. In the depicted example, processor 204 is a service processor. Each SMT-capable processor is capable of concurrently executing multiple hardware threads on the one processor.

Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Network adapter 220 includes a physical layer 282 which conditions analog signals to go out to the network, such as for example, an Ethernet network for an R45 connector. A media access controller (MAC) 280 is included within network adapter 220. Media access controller (MAC) 280 is coupled to bus 216 and processes digital network signals. MAC 280 serves as an interface between bus 216 and physical layer 282. MAC 280 performs a number of functions involved in the transmission and reception of data packets. For example, during the transmission of data, MAC 280 assembles the data to be transmitted into a packet with address and error detection fields. Conversely, during the reception of a packet, MAC 280 disassembles the packet and performs address checking and error detection. In addition, MAC 280 typically performs encoding/decoding of digital signals transmitted and performs preamble generation/removal as well as bit transmission/reception.

Additional PCI bus bridges 222 and 224 provide interfaces for additional PCI buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Service processor 204 interrogates system processors, memory components, and I/O bridges to generate and inventory and topology understanding of data processing system 200. Service processor 204 also executes Built-In-Self-Tests (BISTs), Basic Assurance Tests (BATs), and memory tests on all elements found by interrogating a system processor, memory controller, and I/O bridge. Any error information for failures detected during the BISTs, BATs, and memory tests are gathered and reported by service processor 204.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The present invention may be executed within one of the computers or data processing systems depicted in FIG. 1 or 2. As a specific, commercially available example, the data processing system implementing an adjunct partition such as described hereinbelow can be built upon technologies found in IBM's p/i Series product line firmware and systemware, such as described in the "Power Architecture Platform Reference" (PAPR) material at Power.org (http://www.power.org/members/developers/specs/PAPR_Version_2.2_09Oct07.pdf).

One or more aspects of the present invention can also be included in an article of manufacture (e.g., one or more computer program products) having, for instance, computer readable media. The media has therein, for instance, computer readable program code or logic (e.g., instructions, code, commands, etc.) to provide and facilitate the capabilities of the present invention. The article of manufacture can be included as a part of a computer system or sold separately. One example of an article of manufacture or a computer program product is illustrated in FIG. 2 and incorporates computer readable program code 292 stored on a computer readable medium such as an optical disk 294, and readable by an optical drive 290 coupled to data processing system 200. Additional examples of computer readable media include various physical and/or non-transitory media such as a semiconductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-RAN) and DVD.

A sequence of program instructions or a logical assembly of one or more interrelated modules defined by computer readable program code or logic direct the performance of one or more aspects of the present invention.

Although various embodiments are described herein, these are only examples. Moreover, an environment may include an emulator (e.g., software or other emulation mechanisms), in which a particular architecture or subset thereof is emulated. In such an environment, one or more emulation functions of the emulator can implement one or more aspects of the present invention, even though a computer executing the emulator may have a different architecture than the capabilities being emulated. As one example, in emulation mode, the specific instruction or operation being emulated is decoded, and an appropriate emulation function is built to implement the individual instruction or operation.

In an emulation environment, a host computer includes, for instance, a memory to store instructions and data; an instruction fetch unit to fetch instructions from memory and to optionally, provide local buffering for the fetched instruction; an instruction decode unit to receive the instruction fetch unit and to determine the type of instructions that have been fetched; and an instruction execution unit to execute the instructions. Execution may include loading data into a register for memory; storing data back to memory from a register; or performing some type of arithmetic or logical operation, as determined by the decode unit. In one example, each unit is implemented in software. For instance, the operations being performed by the units are implemented as one or more subroutines within emulator software.

Further, a data processing system suitable for storing and/or executing program code is usable that includes at least one hardware-implemented processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output (I/O) devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The capabilities of one or more aspects of the present invention can be implemented in software, firmware, hardware, or some combination thereof. At least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted, or modified. All of these variations are considered a part of the claimed invention.

In addition, various program code described herein may be identified based upon the application or software component within which it is implemented in specific embodiments of the invention. However, it should be appreciated that any particular program nomenclature used herein is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Adjunct Partitions

Embodiments consistent with the invention utilize adjunct partitions, or partition adjuncts, which are partitions that are more limited than full, logical partitions. As described below, the adjunct partition runs in a flat, static effective address space and problem state. These restrictions permit the hypervisor to apply a range of hypervisor and processor optimizations that result in a substantial decrease in system overhead associated with a context switch of the state machine from a logical partition to state data of an adjunct partition, that is, compared to a context switch of the state machine between logical partitions. In other respects, an adjunct partition is similar to a full logical partition. For example, an adjunct partition can be assigned resources, either physical or virtual, similar to a full logical partition. Further, an adjunct partition can be an end-point of a virtual input output (VIO) communications mechanism, similar to a full logical partition, such as a virtual input output server (VIOS).

Figure 3:
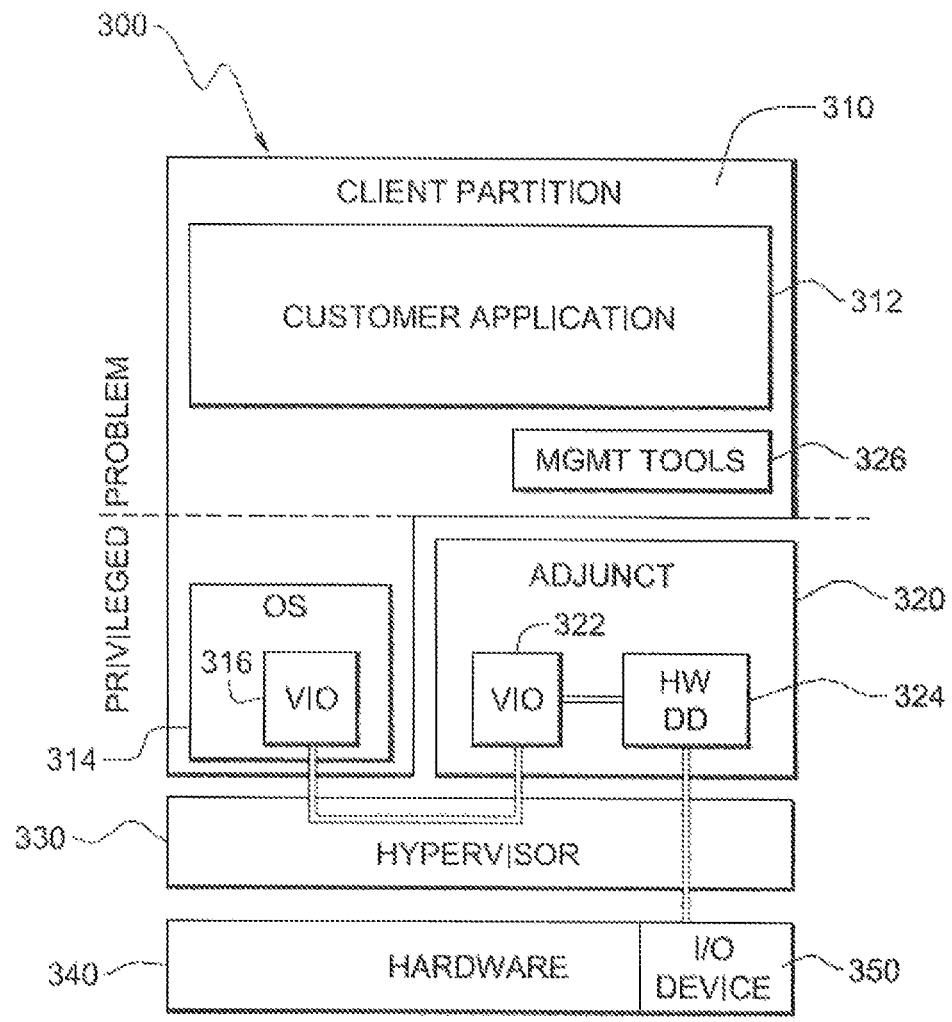
FIG. 3 illustrates one embodiment of a data processing system comprising a client logical partition and an adjunct partition, in accordance with an aspect of the present invention.

FIG. 3 illustrates one example of a data processing system 300, comprising a client logical partition (or simply client partition) 310 and an adjunct partition 320, in accordance with an aspect of the present invention. Client partition 310 is a logical partition which comprises one or more customer applications 312, an operating system instance 314 and a virtual I/O facility 316. Client partition 310 runs atop a hypervisor 330, and provides higher-level function than that provided by the hypervisor itself. Hypervisor 330 executes atop the underlying system hardware 340, which is shown to include one or more I/O devices 350.

Adjunct partition 320 is conceptually a child partition to client partition 310. The adjunct partition is less than a full logical partition, but is run in a manner whereby the hypervisor enforces security and isolation between the adjunct partition and the client partition it runs within. The adjunct partition is provided with reduced functionality compared with a full logical partition, for example, has no access to memory management unit (MMU) configuration or floating-point facilities, and is an environment that only the functionality needed to run the desired service (e.g., I/O driver) is provided. In the illustrated example, adjunct partition 320 includes a virtual I/O interface 322 and a hardware device driver service 324, which allows access to I/O device 350. In operation, client partition 310 accesses I/O device 350 via the adjunct partition 320, as illustrated. By reducing functionality within the adjunct partition environment, the run time overhead of dispatching and maintaining the adjunct partition (compared with another full logical partition) is reduced, and consequently, many of the performance disadvantages of using a separate logical partition as a virtual input output server (VIOS) are avoided.

As a specific example, the adjunct partition is described herein as running a reduced operating system environment for a device driver service. This service is provided by way of example only. The adjunct partition provides minimal, optimized, infrastructure comprising only (in one example) the structure needed by a device driver. For instance, if a Linux device driver is to run inside of the adjunct partition, then the minimal execution environment includes only the Linux kernel services or equivalent services, that the Linux device driver requires. If an AIX device driver is to run inside of the adjunct partition, then the minimal execution environment includes only the AIX kernel services, or equivalent services, that the AIX device driver requires. Advantageously, the adjunct partition runs in hypervisor/problem-state, directly against hypervisor interfaces. As explained in detail below, dispatching of the adjunct partition does not require a full partition context switch, which simplifies adjunct kernel requirements. This is achieved, in part, by mapping the adjunct partition into the client partition's virtual address page table. Client partition to adjunct partition isolation can be achieved, for example, via hypervisor-managed memory keys. Advantageously, the adjunct partition is not customer viewable. Further, the same adjunct partition service (referred to herein as a global adjunct partition service) may be instantiated within multiple client partitions, as explained below.

Various adjunct partition usage models can be implemented in accordance with the concepts disclosed herein for addressing a number of operating system and platform issues. One example is a local adjunct partition, which conceptually partially resides within an initiating client partition for accessing dedicated resources through a hypervisor. For example, a common adapter/driver service may be provided by adjunct partition for a respective dedicated adapter (i.e., resource).

As another alternative, a global adjunct partition may be used, wherein a service logical partition such as a virtual input output server partition donates memory and physical resources for instantiation of the adjunct partition. Such a global adjunct partition may be accessible or attachable by multiple client partitions, and may provide, for example, input output services to a resource via a hypervisor. As a specific example, the global adjunct partition may comprise a common adapter driver service, and the resource a shared adapter. Yet another embodiment of a global adjunct partition may rely on a hypervisor to provide resources for the adjunct. In this implementation, the hypervisor employs the adjunct partition for its own use, for example, for protection or isolation services that would otherwise exist in the hypervisor's execution domain.

In the illustrated embodiments, in order for an adjunct partition to be a runable program, the hypervisor, along with a client partition that is to use the adjunct partition service, negotiate to establish the adjunct partition environment. Once this negotiation is complete, the client partition will have donated a portion of its virtual address space to the hypervisor for use by the adjunct partition. The hypervisor will use hardware and hypervisor facilities to ensure that the client partition no longer has access to or can modify the donated resources (e.g., the donated virtual address space). The hypervisor instantiates the effective address mappings required to run the adjunct partition using the donated virtual address resources. Subsequently, the hypervisor may switch between dispatching the client partition or the adjunct partition by reprogramming its control of the donated virtual address space. When the client partition runs, it may access all virtual address space assigned to it, except for the donated virtual address range, and when the adjunct partition runs, the hypervisor disables access to all virtual addresses of the client partition, except for the donated virtual address range, that is, the virtual address space to which it is enabled. This toggling of active/inactive virtual address ranges is significantly faster than reprogramming the full memory management and address translation hardware to effect a complete context switch of the current state machine between two full logical partitions, as is necessary to switch, for example, to a virtual input/output server partition. In this manner, the adjunct partition address space is carved out of and separated from the memory management and address translation hardware resources of the client partition. The adjunct partition is thus, from a processor's perspective, part of the client partition, but from the client partition's and hypervisor's perspective, is a distinct entity.

Advantageously, the adjunct partition concepts presented herein reduce the need to use full logical partitions for providing services to client partitions. This in turn frees up resources and improves performance for customer workloads. Additionally, the adjunct partition disclosed herein encourages the development and deployment of virtual platform services in lieu of development of operating system specific services by reducing the performance penalties associated with virtualized services. This in turn allows for savings and cost development, since services may be implemented only once (i.e., in an adjunct partition), rather than natively among multiple operating systems.

Additional details regarding adjunct partitions, their configuration and use, and the various modifications that may be implemented in adjunct partitions consistent with the invention, may be found, for example, in U.S. patent application Ser. No. 12/111,020 filed Apr. 28, 2008 by Armstrong et al. (now published as U.S. P.G. Pub. No. 2009/0037941), which claims priority to U.S. Provisional Application Ser. No. 60/953,512, filed Aug. 2, 2007, each of which is incorporated by reference herein in its entirety.

Figure 4A:
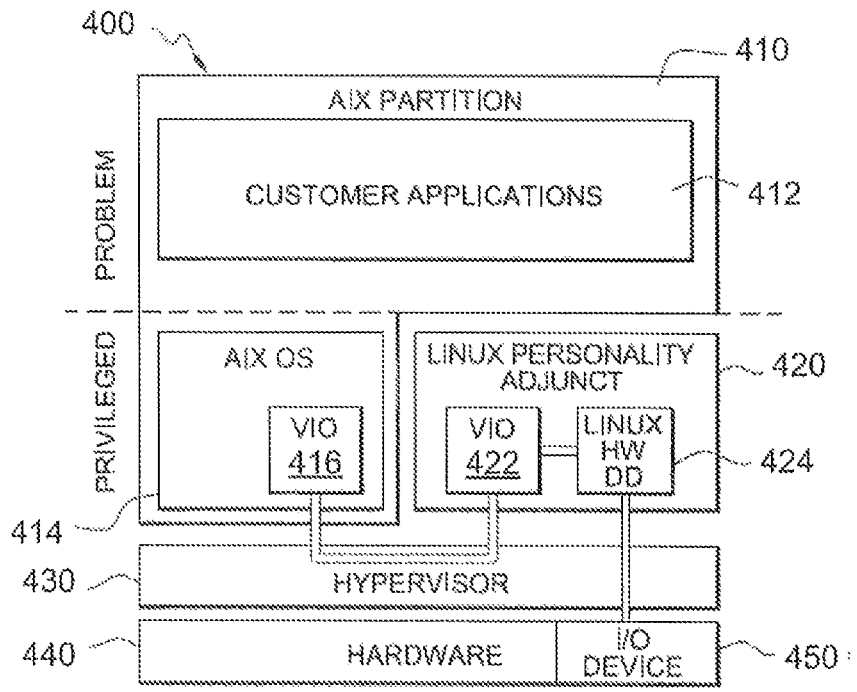
FIGS. 4A & 4B illustrate examples of an adjunct partition configuration wherein non-native operating system's device drivers are employed to access or use a physical input/output device, in accordance with an aspect of the present invention.
Figure 4B:
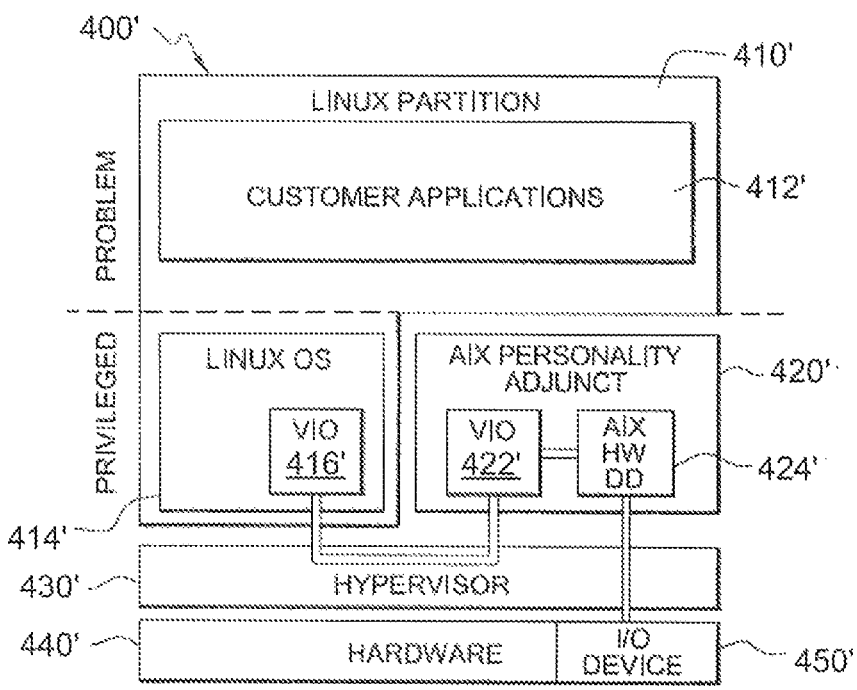

As noted above, one usage of adjunct partitions is to host device drivers, which can reduce device driver development costs by enabling device drivers to be shared between operating systems. Adjunct partitions are lightweight execution environments which operate in a separate execution state from the conventional problem and privileged states of the user applications and kernel services, respectively. This new execution state is referred to herein as the hypervisor/problem state, and is illustrated in FIGS. 4A & 4B (wherein AIX and Linux are depicted by way of example only). As explained below, instead of deploying a full VIOS partition, an operating system may instead employ an adjunct partition to support a particular, non-configurable I/O device assigned to that logical partition. In such a case, an adjunct partition is created which employs a non-native operating system's device driver as an interface to the assigned physical I/O device. Note that the native and non-native operating systems may be any two different operating systems.

FIG. 4A depicts one example of this aspect of the present invention. In this figure, a data processing system 400 is shown to comprise an AIX partition 410 and a Linux personality adjunct partition (or Linux personality adjunct) 420. AIX partition 410 is a logical partition which includes one or more customer applications 412, an AIX operating system instance 414, and a virtual I/O facility 416. AIX partition 410 runs above a hypervisor 430, and provides higher-level function than that provided by the hypervisor. Hypervisor 430 executes on top of the underlying system hardware 440, which is shown to include (one or more) I/O device 450 assigned to AIX partition 410.

Linux personality adjunct 420 is conceptually a dedicated, child partition to AIX partition 410. As described above, the adjunct partition is less than a full logical partition, but is running in a manner whereby the hypervisor enforces security and isolation between the adjunct partition and the AIX partition it runs with. The adjunct partition is provided with reduced functionality compared with a full logical partition. For example, the adjunct partition has no access to memory management unit (MMU) configuration or floating-point facilities, and is an environment wherein only the functionality needed to run the desired service (e.g., I/O driver) is provided.

In the illustrated example, the Linux personality adjunct 420 includes a virtual I/O interface 422 and a hardware device driver service 424, which allows access to I/O device 450. In this example, the hardware device driver service 424 is a Linux hardware device driver, which runs within the Linux personality adjunct 420 spawned by the AIX partition 410 in response to the AIX partition noting that it had assigned to it an I/O device 450 which was non-configurable by the AIX partition. The Linux personality adjunct 420 includes non-native kernel services sufficient to run the Linux hardware device driver for the physical I/O device. These non-native kernel services are less than a corresponding, full operating system, that is, less than a full Linux operating system in this example.

In operation, AIX partition 410 accesses I/O device 450 via the virtual I/O interface 416, 422 between the AIX operating system 414 and the Linux personality adjunct 420, which includes the Linux hardware device driver 424. By providing the non-native, Linux personality to the adjunct partition, the Linux hardware device driver is able to be run within the adjunct partition, and thereby provide access to an I/O device 450 originally assigned to AIX partition 410, notwithstanding that the I/O device is non-configurable by the AIX partition. The device becomes accessible to the AIX partition through the Linux personality adjunct 420.

FIG. 4B depicts another example of the use of an adjunct partition to provide access to a non-configurable I/O device assigned to a logical partition, which in this case is a Linux partition 410' of a data processing system 400'. The adjunct partition for this implementation is an AIX personality adjunct 420', which includes sufficient non-native, AIX kernel services within the adjunct partition to run a non-native operating system's device driver, that is, an AIX hardware device driver 424' in this example. These non-native kernel services are less than a corresponding, full operating system, that is, less than the full AIX operating system conventionally required to run the AIX hardware device driver. The Linux partition 410' is a logical partition which includes one or more customer applications 412', a Linux operating system 414', and a virtual I/O facility 416'. Linux partition 410' runs above a hypervisor 430', and provides higher-level function than that provided by the hypervisor. Hypervisor 430' executes on top of the underlying system hardware 440', which is shown to include (one or more) I/O device 450'.

AIX personality adjunct 420' is again conceptually a child partition to client partition 410'. The adjunct partition is less than a full logical partition, but is run in a manner whereby the hypervisor enforces security and isolation between the adjunct partition and the client partition it runs within, as described above. The adjunct partition is an environment wherein only the functionality needed to run the desired service (e.g., I/O driver) is provided. In this example, it is assumed that the adjunct is dedicated to the spawning logical partition, that is, Linux partition 410'.

In the illustrated example, AIX personality adjunct 420' includes a virtual I/O interface 422' and the AIX hardware device driver 424', which allows access to I/O device 450'. In operation, Linux partition 410' accesses I/O device 450' via the adjunct partition 420', as illustrated.

As used herein, a personality adjunct is an adjunct partition which has a particular operating system personality, but is less than the full operating system. In the implementation described herein, the personality adjunct is a non-native personality to the native operating system of the logical partition spawning the adjunct partition. For example, AIX partition 410 of FIG. 4A initiates creation of a Linux personality adjunct, while Linux partition 410' of FIG. 4B initiates creation of an AIX personality adjunct. These are provided by way of example only. In an alternate implementation, the personality adjunct may be a native personality to a native operating system of the logical partition spawning the adjunct partition. Further, in the non-native implementation, the personality implemented within the adjunct partition may be any non-native operating system to any native operating system of the logical partition. The personality adjunct includes a minimal service set of an operating system device driver runtime environment required by a particular device driver to run inside the adjunct. A device driver conforms to a programming environment that is defined by its host operating system environment. This programming environment typically includes a variety of kernel services for things such as memory allocation, timer services, interrupt handler registration, and invocation in response to interrupts, mapping I/O buffers for DMA (direct memory access), etc. The personality adjunct provides these services and functions in the same way that a real host operating system kernel does, such that the device driver running inside the adjunct does not know the difference between its native host operating environment and the personality adjunct described herein. This enables the unmodified device driver to be run within a lighter weight adjunct partition, in place of a full logical partition.

By way of specific example, the Linux personality adjunct 420 of FIG. 4A provides a runtime environment and kernel services which mimic the Linux device driver programming interfaces and execution environment, while the AIX personality adjunct 420' of FIG. 4B provides the runtime environment and kernel services which mimic the AIX device driver programming interfaces and execution environment of a full AIX operating system.

Multiple adjunct partitions may also be employed to provide multiple logical partitions with access to, for example, a self-virtualizing input/output device, such as a self-virtualizing input/output adapter. In a virtualized system, if a single input/output adapter is present, and that adapter is to service multiple logical partitions of the data processing system, then input/output virtualization (IOV) capabilities of the input/output device, if present, may be employed to instantiate multiple virtual functions (VF), each of which appears as an input/output adapter to a respective client logical partition. One example of a self-virtualizing input/output device is the single root input/output virtualized hardware described, for example, in "Single Root I/O Virtualization and Sharing Specification", Revision 1.0, PCI-SIG (Sep. 11, 2007), which is incorporated herein by reference in its entirety.

Adjunct partition instances may be deployed in a manner wherein each adjunct partition instance is created to support a particular logical partition to virtual function (or queue pair) pairing. Using this approach, each logical partition accesses a corresponding virtual function or queue pair employing abstract virtual input/output mechanisms. From the point of view of the client partition, this functionality is similar (or equivalent) to a VIOS implementation. However, the disadvantages of such a system are avoided since each logical partition to virtual function (or queue pair) association has a unique adjunct partition instance facilitating communication therebetween. Since each adjunct partition instance handles only a single logical partition and a single virtual function (or queue pair) it is not necessary to include locks or synchronization mechanisms otherwise needed to support multiplexing of the I/O adapter, since the system relies on the multiplexing capabilities within the self-virtualizing input/output capable device itself.

Another advantage of this adjunct partition implementation is that, since all adjunct partition instances are considered for the same device, they are able to share code and read only data, which substantially reduces the memory foot-print required to support the implementation, with the memory foot-print cost of adding an adjunct partition instance being simply the cost associated with maintaining dynamic state information for the logical partition to virtual function (or queue pair) pairing for the new adjunct partition instance.

Further, adjunct partition instances, since they are configured to support only one logical partition to virtual function (or queue pair) pairing at a time, may be readily written in a manner to avoid many of the synchronization and locking mechanisms required by traditional I/O stacks and drivers, both in native device drivers and VIOS-based implementations. For example, adjunct partitions may be written as polling state machines, and the dedicated nature of their runtime environment precludes the need to support active preemption, thus simplifying or eliminating the need for locking.

To summarize, the use of adjunct partitions in the manner described herein permits logical partitions to obtain I/O services from input/output virtualization-capable, input/output devices or adapters in a manner that minimizes the device-driver development required for each operating system of the logical partition, since the operating systems only see virtual input/output (VIO) services (e.g., device driver services), not specific physical input/output adapter devices. This avoids the need to instantiate a logical partition to multiplex the underlying I/O hardware, and permits the multiplexing of I/O hardware to be accomplished via efficient VIO hardware capabilities, rather than software locks in a VIOS. This last aspect is a property that arises from the unique programming model of an adjunct partition, and assumes that a particular adjunct partition implementation used to support a particular I/O device makes use of these properties to create an efficient implementation.

Figure 5:
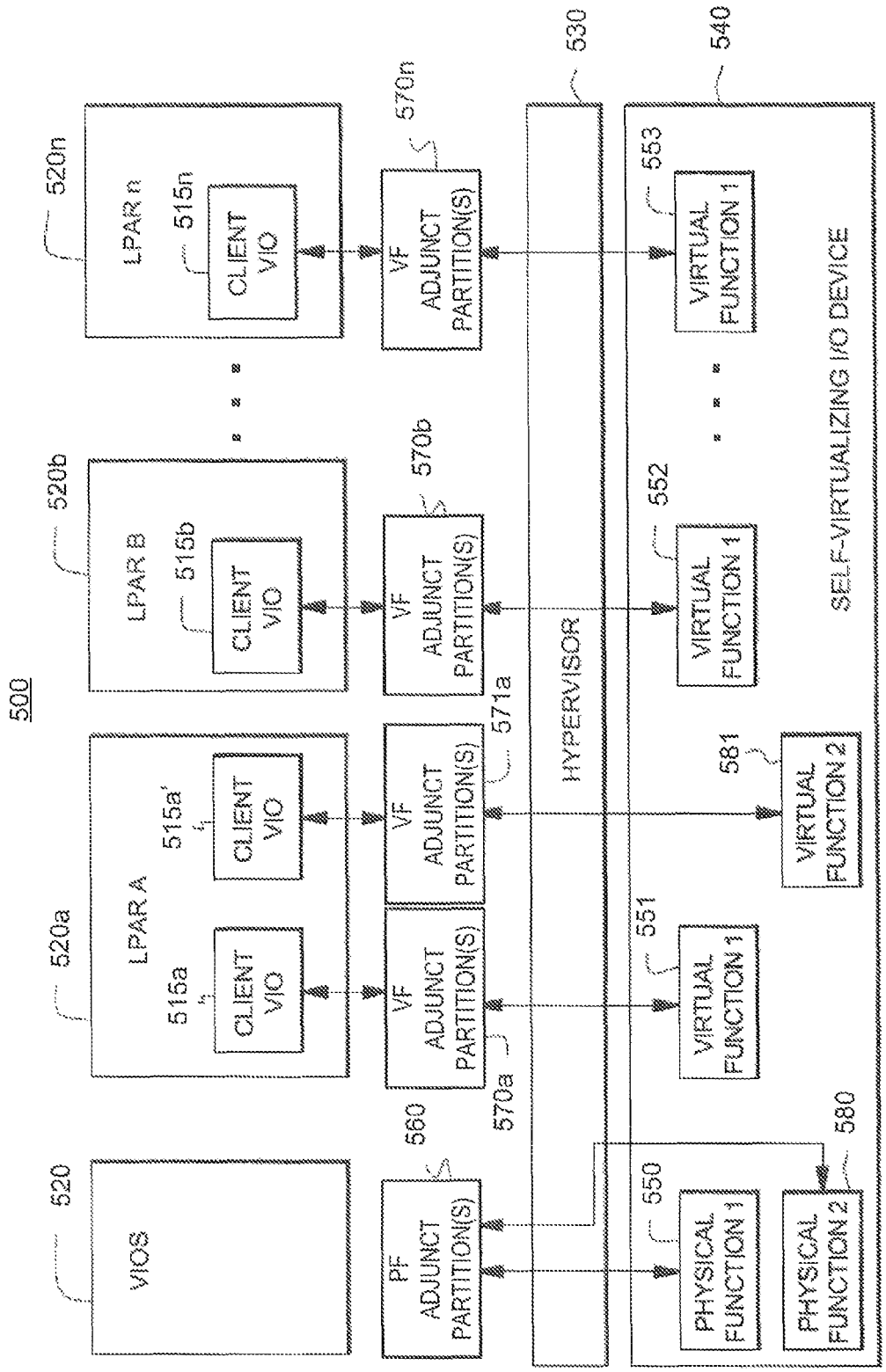
FIG. 5 illustrates one embodiment if a data processing system wherein multiple logical partitions are interfaced via device drivers within the multiple logical partitions to multiple virtual function instances of a self-virtualizing IO resource.

FIG. 5 depicts one embodiment of a data processing system, generally denoted 500, in accordance with an aspect of the present invention. Within data processing system 500, multiple logical partitions 510*a*, 510*b* . . . 510*n*, and a VIOS 520 run above a hypervisor 530, and provide higher-level function than that provided by the hypervisor. Hypervisor 530 executes on top of underlying system hardware, including a self-virtualizing input/output device (or adapter) 540. VIOS 520 is optional within the data processing system embodiment depicted. The self-virtualizing input/output device 540 is, in one embodiment, an input/output virtualization capable I/O adapter. This adapter may present multiple virtual function instances 551, 552, 553 from a first physical function 550, each of which presents the functionality associated with a normal I/O adapter. Further, in this embodiment, a second physical function 580 is depicted, from which a second virtual function 581 is provided, by way of example.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 570*a*, 571*a*, 570*b*, 570*n* are referred to as virtual function (VF) adjunct partitions due to the dedicated nature of the adjunct partitions to a particular logical partition to virtual function pairing. For all virtual functions associated with a same underlying hardware device, i.e., physical function 550 or physical function 580, the adjunct partition instances instantiated are the same. That is, each adjunct partition instance 570*a*, 570*b* . . . 570*n* is the same, while adjunct partition instantiation 571*a* is assumed to be different since it interfaces to a different virtual function 581, associated with a different physical function 580. Advantageously, by interjecting adjunct partitions between the logical partitions and the virtual functions, the input/output within each logical partition can be virtualized as a client virtual input/output (VIO) 515*a*, 515*a'*, 515*b* . . . 515*n*.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification". The physical function would thus contain the SR-IOV capability structure. A virtual function is associated with the physical function, and shares one or more physical resources, such as a link, with the physical function and with other virtual functions that are associated with the same virtual function. A "function" means, in one embodiment, an addressable entity in configuration space associated with a single function number. A function may refer to one function in a multi-function device, or to the only function in a single-function device.

A physical function adjunct partition 560 is employed during initial configuration of the data processing system to facilitate setup of the virtual function adjunct partitions. Note that in the data processing system embodiment depicted in FIG. 5, multiple physical functions and multiple different virtual function instances are illustrated, two of which are accessed by a single logical partition via different virtual function adjunct partitions 570a, 571a. One, two or more than two physical functions may be implemented within the self-virtualizing input/output device, and each logical partition may access one or more of these physical functions via an associated virtual function of the device. Also, note that the client virtualized interfaces or drivers (client VIO 515a, client VIO 515a') within LPAR A 510a may be the same or different types of virtual interfaces or drivers, depending on the adjunct partition instances implemented for the particular logical partition to virtual function pairing.

The virtual function adjunct partitions 570a, 571a, 570b, 570n implement, in one embodiment, a server virtual adapter device driver, which interfaces with the respective client VIO within the associated logical partition, as well as a device driver for the virtual function on the self-virtualizing input/output device adapter. Each adjunct partition drives the respective virtual function on the adapter similar to the server virtual adapter device driver within a VIOS implementation. Creation of the adjunct partitions may be initiated by the respective logical partition, or by the hypervisor within the data processing system. Further, the advantages and characteristics of the respective adjunct partitions would be the same as described above. By way of example, each adjunct partition may implement a non-native operating system's device driver from the native operating system of the associated logical partition.

Those skilled in the art will note from the above discussion that the programming model described herein allows adjunct partition code developers to write code in a manner that allows typical operating system-kernel-code locking and synchronization primitives to be simplified or avoided. Adjunct partitions may be efficiently written as single-threaded polling state machines, and by controlling the degree of concurrency visible to a particular adjunct partition instance, it is possible to ensure that adjunct partition code may assume a runtime environment that is non-preemptive and single-threaded. For input/output processing work, there is little need for multiple threads to simultaneously execute to service a particular logical partition to virtual function pairing. These properties are feasible because each adjunct partition instance services a single logical partition to virtual function pairing in an isolated/protected environment (that is, a separate dispatchable state protected as described above), and adjunct partition instances can be deployed with overhead low enough to permit a single adjunct instance per logical partition to virtual function pairing, unlike a VIOS implementation.

Similarly, a data processing system similar to data processing system 500 may be utilized in connection with a self-virtualizing input/output device that utilizes a basic function and a queue structure virtualizable into multiple queue pairs. Each queue pair may be associated with the function, and may share one or more physical resources, such as a link, with the function and with other queue pairs that are associated with the same function. Multiple adjunct partitions may be employed to interface, for example, multiple logical partitions to respective queue pairs within the self-virtualizing input/output device, with a function adjunct partition employed during initial configuration of the data processing system to facilitate initial setup of the adjunct partitions. By providing an adjunct partition as an interface between each logical partition to queue pair pairing, a virtual input/output interface or driver can be employed within the respective logical partition. In this case, the logical partition is unaware of the actual type of hardware employed. The adjunct partition may include, for example, a server virtual device driver interfaced to a respective client VIO of the associated logical partition, as well as an appropriate physical adapter device driver for interfacing to the respective queue pair within the self-virtualizing input/output device.

Additional details regarding adjunct partitions are described in the aforementioned cross-referenced applications. In addition, various modifications to the adjunct partitions described herein will be appreciated by one of ordinary skill in the art having the benefit of the instant disclosure. Therefore, the invention is not limited to the particular adjunct partition implementations discussed herein.

Vendor-Independent Adjunct Management Channel Interface

To facilitate the integration of new or upgraded self-virtualizing IO resources such as self-virtualizing network adapters, a vendor-independent interface may be utilized between a hypervisor and an adjunct partition associated with a self-virtualizing IO resource to effectively abstract away vendor-specific interface details for managing and configuring the self-virtualizing IO resource.

Figure 6:
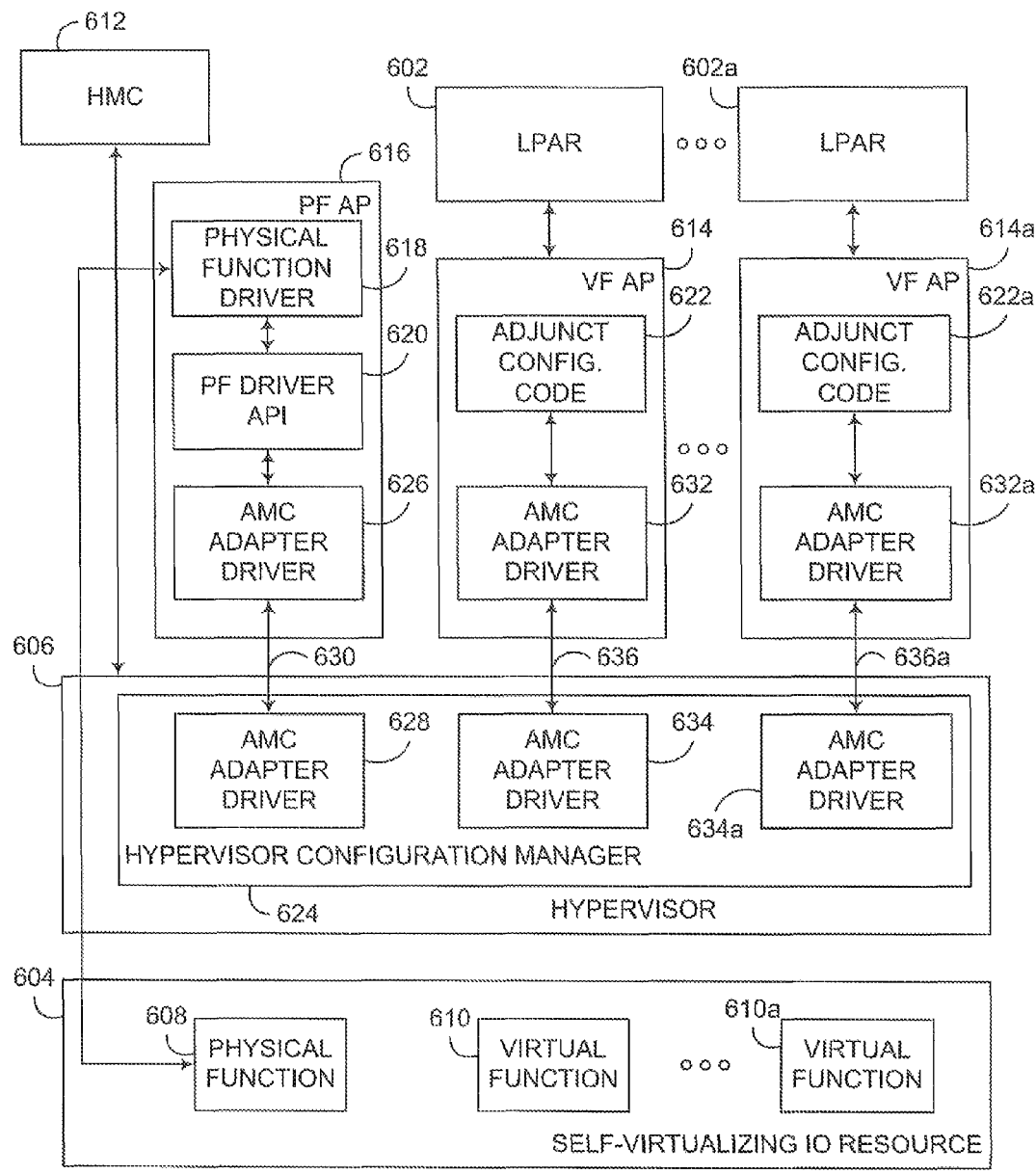
FIG. 6 illustrates one embodiment of a data processing system wherein a hypervisor is interfaced with multiple adjunct partitions for a self-virtualizing IO resource using a vendor-independent adjunct management channel (AMC) interface consistent with the invention.

As shown in FIG. 6, for example, a data processing system 600 may include multiple logical partitions 602, 602a interfacing with a self-virtualizing IO resource 604 through a hypervisor 606. Hypervisor 606 executes on top of other underlying system hardware in addition to self-virtualizing IO resource 604; however, only resource 604 is illustrated to facilitate a better understanding of the invention. The self-virtualizing input/output device 604 is, in one embodiment, an input/output virtualization capable I/O adapter. This adapter may present multiple physical functions, each of which presenting the functionality associated with a non-virtualized I/O adapter, and each with multiple virtual function instances associated therewith, e.g., physical function 608 with associated virtual function instances 610, 610a. A hardware management console (HMC) 612, run above a hypervisor 606, may optionally be used to provide higher-level function than that provided by the hypervisor.

Each virtual function is assigned to provide I/O services to a particular logical partition in the data processing system. The logical partitions in question avoid having direct interactions with their virtual functions, so as to maintain hardware abstraction, by employing adjunct partition instances instantiated for each logical partition to virtual function pairing. These adjunct partitions 614, 614a, which are implemented as firmware components for data processing system 600, are referred to as virtual function (VF) adjunct partitions due to the dedicated nature of the adjunct partitions to a particular logical partition to virtual function pairing. For all virtual functions associated with a same underlying hardware device, i.e., physical function 608, the adjunct partition instances instantiated are the same. That is, each adjunct partition instance 614, 614a is the same.

By way of specific example, the underlying physical function might comprise a peripheral component interconnect (PCI) function that supports the single root I/O virtualization capabilities (SR-IOV) defined in the above-referenced "Single Root I/O Virtualization and Sharing Specification," and described above in connection with FIG. 5. The physical function would thus contain the SR-IOV capability structure.

A virtual function is associated with the physical function, and shares one or more physical resources, such as a link, with the physical function and with other virtual functions that are associated with the same virtual function.

A physical function adjunct partition 616 is employed during initial configuration of the data processing system to facilitate setup of the virtual function adjunct partitions. One, two or more than two physical functions may be implemented within the self-virtualizing input/output device, and each logical partition may access one or more of these physical functions via an associated virtual function of the device.

It the illustrated embodiment, physical function adjunct partition 616 includes a physical function device driver 618, which is used to access physical function 608 of resource 604 for the purpose of managing and configuring the resource. An Applications Programming Interface (API) 620 may also be used to abstract vendor-specific details of a particular resource 604. Driver 618 implements at least a portion of the vendor-specific adjunct partition configuration program code for physical function adjunct partition 616.

It may also be desirable to implement within each logical partition 602, 602a and each associated adjunct partition 614, 614a a vendor-independent virtual network partition interface, e.g., as disclosed in U.S. patent application Ser. No. 12/946,316, filed on Nov. 15, 2010 by Cunningham et al., and entitled "VIRTUALIZATION OF VENDOR SPECIFIC NETWORK INTERFACES OF SELF-VIRTUALIZING INPUT/OUTPUT DEVICE VIRTUAL FUNCTIONS," which is incorporated by reference herein.

Each virtual function adjunct partition 614, 614a includes adjunct configuration program code 622, 622a, which is used to configure the adjunct partition. Hypervisor (PHYP) 606 includes a configuration manager 624, which is used to coordinate configuration and management of resource 604 and the adjunct partitions 614, 614a, 616 associated therewith. In this regard, an adjunct management channel (AMC) interface is utilized between the configuration manager 624 and the adjunct partitions. The adjunct management channel interface is implemented using paired virtual adapters resident respectively in the adjunct partitions and the hypervisor.

For physical function adjunct partition 616, for example, an AMC adapter device driver 626 interfaces with a corresponding AMC adapter device driver 628 resident in hypervisor 606 over an AMC channel 630. Likewise, for virtual function adjunct partitions 614, 614a, AMC adapter device drivers 632, 632a interface with corresponding AMC adapter device drivers 634, 634a resident in hypervisor 606 over AMC channels 636, 636a.

In the illustrated embodiment, the AMC interface relies on a network protocol, referred to herein as an AMC protocol, to facilitate communications between paired AMC adapter device drivers, which is similar in many respects to the virtual network interface control (VNIC) protocol described in the aforementioned '316 application.

With the AMC protocol, AMC commands are sent and received between an adjunct partition and the hypervisor. An AMC command may include, for example, a sixteen byte packet, with the first byte assigned a value of 0x80, the second byte being a Command Type field, the next fourteen bytes being command dependent data. AMC commands have AMC command values from 0x0 to 0x7F, and each response to a command has a command value equal to the command with the 0x80 bit in the command turned on.

Table I below illustrates Command Types supported by the AMC protocol. For the purposes of this discussion, PHYP corresponds to the hypervisor, while AP corresponds to firmware in an adjunct partition:

TABLE I

AMC Command Types

| Command Type | Command value | Sent by | Description |
| --- | --- | --- | --- |
| VERSION_EXCHANGE | 0x01 | PHYP | Exchange the version of the AMC protocol used by PHYP |
| VERSION_EXCHANGE_RSP | 0x81 | AP | Exchange the version of the AMC protocol used by AP |
| HEARTBEAT_START | 0x02 | PHYP | Used to start heartbeat notifications |
| HEARTBEAT | 0x82 | AP | Notify PHYP of adjunct operation |
| OUTLINE_CMD | 0x03 | PHYP/AP | Used for outline commands |
| OUTLINE_CMD_RSP | 0x83 | PHYP/AP | Response to outline commands |
| PING | 0x04 | PHYP/AP | Request for PING_RSP |
| PING_RSP | 0x84 | PHYP/AP | Response to PING. |

Table II below illustrates return values supported by the AMC protocol:

TABLE II

AMC Return Values

| Return Code | Value | Definition |
| --- | --- | --- |
| Success | 0 | The requested operation completed successfully. |
| PartialSuccess | 1 | The requested operation completed partially successful. The parameters were valid, but not all resources could be obtained to completely satisfy the command. Check the specific function definition for details. |
| Permission | 2 | The request called for permissions not available. |
| NoMemory | 3 | The request failed due to insufficient memory. |
| Parameter | 4 | One or more parameters were in error in the request. |
| UnknownCommand | 5 | The specific AMC command is unknown. |
| Aborted | 6 | The command was aborted by some other action. |
| InvalidState | 7 | The requested command is invalid at this time. |
| InvalidIOBA | 8 | An I/O bus address passed as a parameter was invalid. |
| InvalidLength | 9 | A length passed as a parameter was invalid. |
| UnsupportedOption | 10 | A reserved value or option was used on an existing command that system firmware does not support. |
| Resource | 11 | The request failed due to insufficient resources. |

TABLE II-continued

AMC Return Values

| Return Code | Value | Definition |
|---|---|---|
| Busy | 12 | The request could not be completed at this time. |
| Reserved | 11-255 | These return codes are reserved. |

Figure 7:
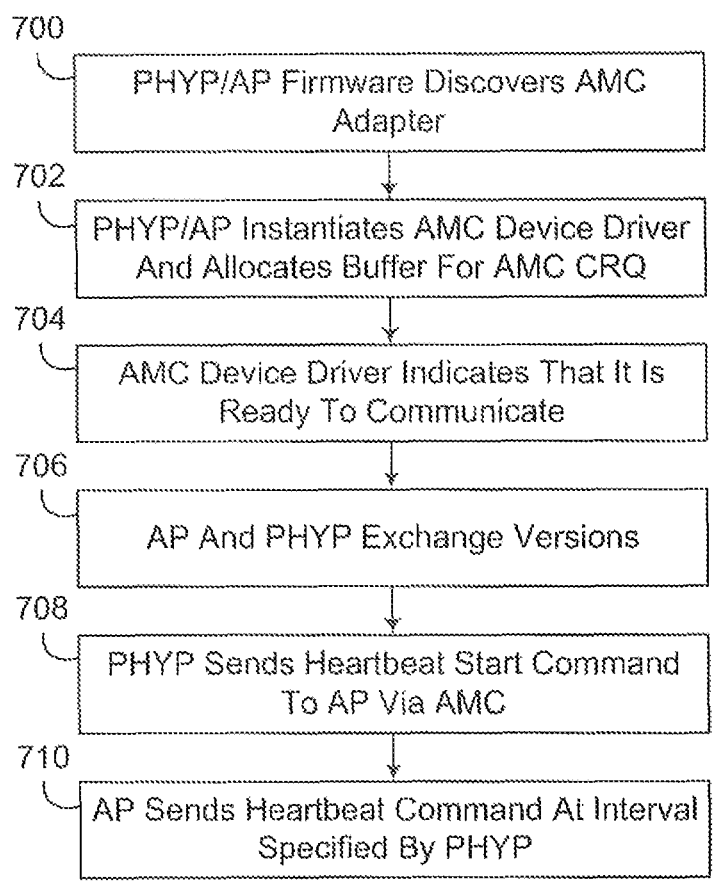
FIG. 7 illustrates an exemplary sequence of operations for AMC startup in the data processing system of FIG. 6.

FIG. 7 illustrates an exemplary initialization flow, or startup sequence, for the AMC protocol. First, the hypervisor or adjunct partition firmware discovers an AMC adapter (block 700). Next, the hypervisor or adjunct partition instantiates the AMC device driver and allocates a buffer for the AMC CRQ (block 702), which is then TCE-mapped using the AMC's translation control entry (TCE) table. The AMC protocol is a command/response protocol, so the AMC client desirably should allocate a CRQ buffer big enough to handle a response for every command it wishes to have outstanding concurrently with firmware with an allowance for unsolicited asynchronous error and link state change CRQ events.

Next, the AMC device driver performs a low level initialization algorithm to indicate that it is ready to communicate (block 704), by making an H_REG_CRQ call specifying the unit address and input/output bus address (IOBA) of the CRQ page(s), and waiting for either an H_Success or INITIALIZATION message. Then, the AMC device driver sends either an INITIALIZATION_COMPLETE or an INITIALIZATION message to firmware by calling H_SEND_CRQ.

Once the INITIALIZATION and INITIALIZATION_COMPLETE messages have been exchanged, the adjunct partition and hypervisor exchange version information (block 706). In particular, the hypervisor sends a VERSION_EXCHANGE using H_SEND_CRQ, specifying the latest version of the AMC specification supported by the hypervisor. Next, the adjunct partition responds with a VERSION_EXCHANGE_RSP specifying the version it supports. Both the hypervisor and adjunct partition are required to support the lower of the two versions. Until and unless the hypervisor receives a VERSION_EXCHANGE_RSP, no further AMC commands may be sent.

Next, the hypervisor sends a HEARTBEAT_START command specifying the value in seconds that the adjunct partition should send the HEARTBEAT commands (block 708). The adjunct partition then begins to send the HEARTBEAT command at the interval specified by the hypervisor (block 710). Initialization of the AMC channel is then complete.

Figure 8:
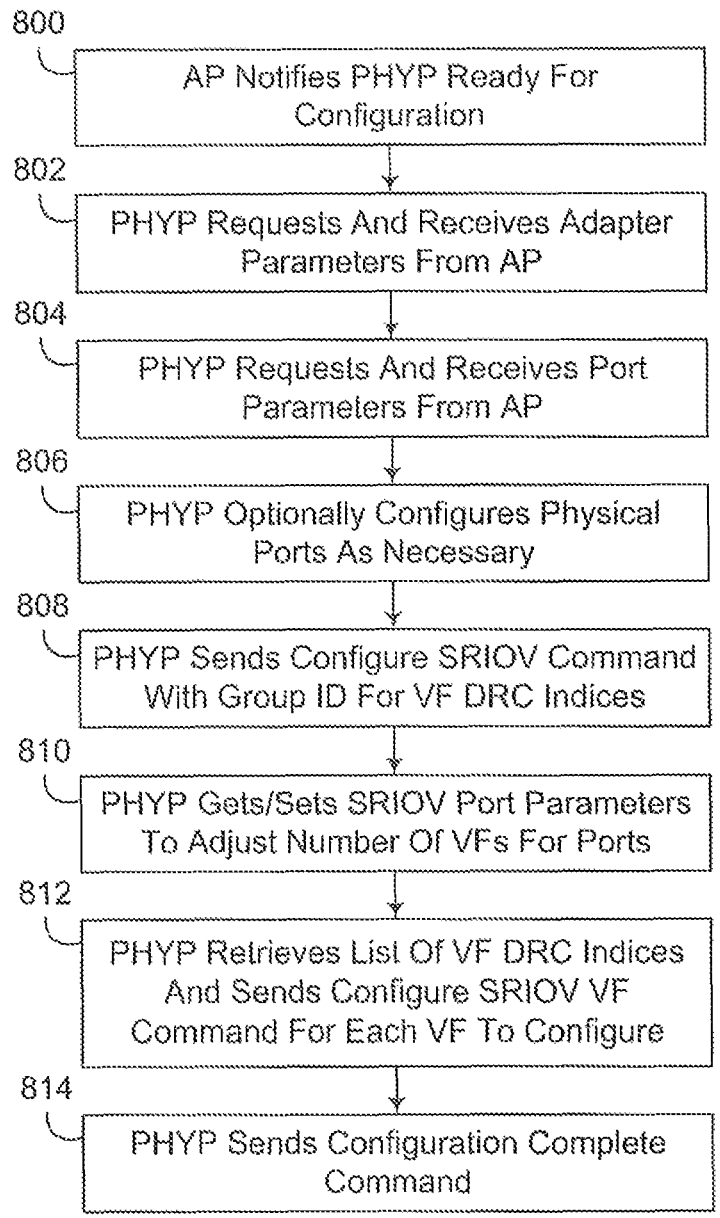
FIG. 8 illustrates an exemplary sequence of operations for configuring a physical function adjunct partition in the data processing system of FIG. 6.

FIG. 8 illustrates an exemplary configuration sequence for the AMC protocol, to configure an SRIOV physical function adjunct partition. First, the adjunct partition notifies the hypervisor that is it ready for configuration, by sending a CONFIG command with a Ready For Configuration subcommand (block 800). Next, the hypervisor requests adapter parameters from the adjunct partition by sending a CONFIG command with a Get Adapter Parameters subcommand (block 802). The adjunct partition then collects the adapter parameters and sends a CONFIG command with the Get Adapter Parameters subcommand response.

Next, the hypervisor requests port parameters from the adjunct partition by sending a CONFIG command with a Get Port Parameters subcommand (block 804). The adjunct partition then collects the physical port parameters and sends a CONFIG command with the Get Port Parameters subcommand response.

Next, the hypervisor optionally configures each physical port with any changes deemed necessary by sending a CONFIG command with a Set Port Parameters subcommand (block 806). The adjunct partition performs the necessary physical port changes based on the port parameters and sends a response to the hypervisor. If any of the port changes were note made, the current value of the port parameters are set in the response and PartialSuccess is returned.

The hypervisor then sends a CONFIG command with a Configure SRIOV subcommand with the group ID for the virtual function DRC indices (block 808), and the adjunct partition finishes the configuration of the virtualization of the physical function and sends a response.

The hypervisor then gets and/or sets any SRIOV port parameters to adjust the number of virtual functions for a given port (block 810), and then the hypervisor retrieves a list of virtual function DRC indices using a Get SRIOV Virtual Function DRC List subcommand, and sends a Configure SRIOV Virtual Function subcommand for each virtual function it would like to configure (block 812). The adjunct partition then configures the virtual function with the supplied parameters and sends an appropriate response. The hypervisor then sends a Configuration Complete subcommand to indicate that it is finished configuring the adjunct partition (block 814).

Figure 9:
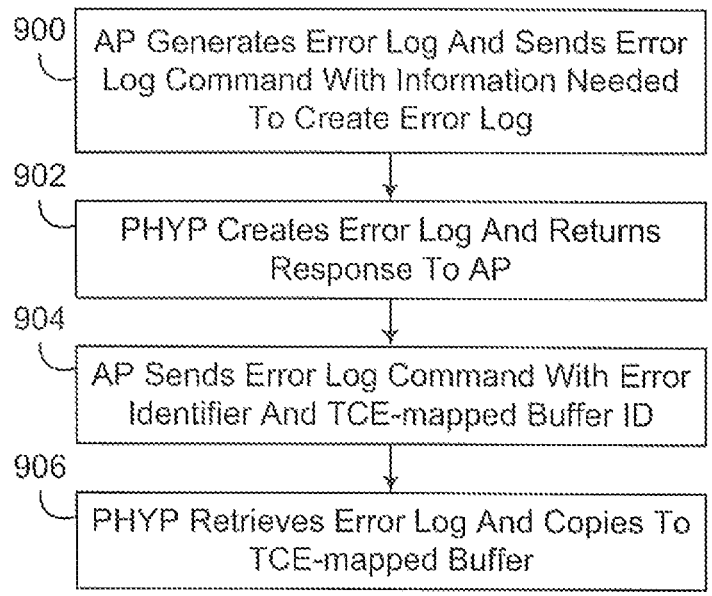
FIG. 9 illustrates an exemplary sequence of operations for creating an error log in the data processing system of FIG. 6.

FIG. 9 illustrates an exemplary error log sequence for the AMC protocol. An adjunct partition generates an error log and sends an ERROR_LOG command with an Error Indication subcommand to the hypervisor, including the SRC, severity, list of user data and other related information for the hypervisor to use to create the error log (block 900). The hypervisor creates the error log and returns an Error Indication subcommand response with the unique Error Identifier and the length of the error log that was created (block 902). The adjunct partition then sends an ERROR_LOG command with a Retrieve Error Log subcommand to the hypervisor, indicating the Error Identifier and a TCE-Mapped buffer in which to store the error log (block 904). Then, the hypervisor retrieves the error log and copies it to the TCE-Mapped buffer using virtual DMA and responds to the Retrieve Error Log subcommand (block 906). If the error log cannot be retrieved, an error is returned.

Figure 10:
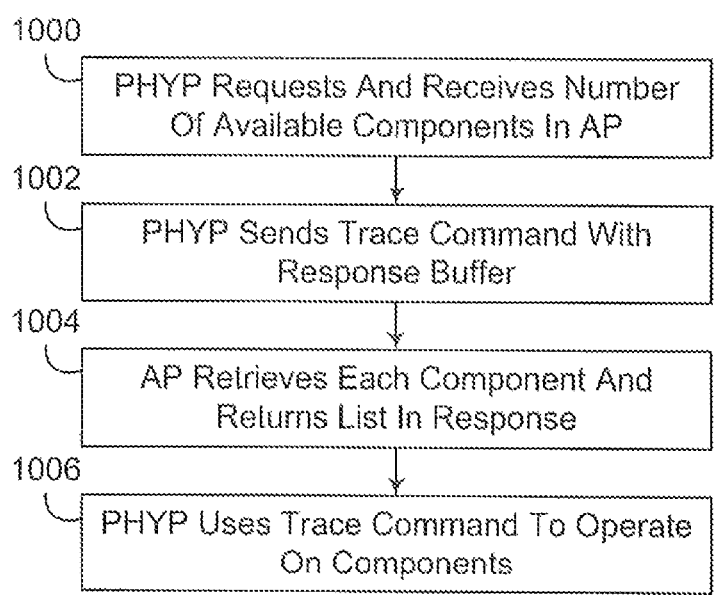
FIG. 10 illustrates an exemplary sequence of operations for performing a trace in the data processing system of FIG. 6.

FIG. 10 illustrates an exemplary trace sequence for the AMC protocol. The hypervisor first requests the number of components that are available, by sending a TRACE command with the Request Number Components subcommand (block 1000). The adjunct partition then returns the number of components that are available and returns that in the Request Number Components subcommand response. The hypervisor then sends a TRACE command with a Request Components subcommand, and including a response buffer that is large enough to hold a firmware component structure for each component. As such, the length of the response buffer may be sizeof(firmware component structure)*number of components (block 1002).

Next, the adjunct partition retrieves each firmware component and returns the list in the Request Components subcommand response (block 1004). The hypervisor then uses the TRACE command with a Collect Trace or Control Trace option and a correlator in the firmware component to operate on a component (block 1006).

An additional operation that may be performed via the AMC protocol is power control. For example, a hypervisor can initiate a power off or dump of a particular adjunct partition, by sending a POWER_CONTROL command with a suitable subcommand. An adjunct partition upon receiving such a command would perform the appropriate action. Likewise, a parent adjunct partition can determine that it needs to perform a control bootable, reboot or dump to a particular child adjunct partition and send an appropriate POWER_CONTROL command to the hypervisor. The hypervisor upon receiving the command may then send the command to the correct adjunct partition, which is handled by the child adjunct partition in the same manner as a hypervisor-initiated command.

Several of the aforementioned commands, e.g., CONFIG, ERROR_LOG, TRACE, and POWER_CONTROL, are implemented as outline commands. The AMC protocol uses outline commands to perform commands that cannot fit entirely within a 16 byte CRQ entry. The command includes a four byte indirect address to a TCE-Mapped buffer that describes the command, and a four byte indirect length representing the total length of the mapped buffer. Types of outline commands can be found in Table III below. All outline commands have a response with a four byte return code and an eight byte correlator, since there is an associated resource of the command/response buffer that must be reclaimed by the sender of the command.

TABLE III

Outline Command Types

| Command Type | Command value | Sent by | Description |
|---|---|---|---|
| CAPABILITIES | 0x01 | PHYP | Used to send capabilities to partner |
| CONFIG | 0x02 | PHYP/AP | Used to send configuration to adjunct partition |
| ERROR_LOG | 0x03 | PHYP/AP | Used to request logging of error log entry |
| TRACE | 0x04 | PHYP | Used to start, retrieve and stop tracing |
| STATISTICS | 0x05 | PHYP | Used to retrieve statistics information |
| POWER_CONTROL | 0x06 | PHYP/AP | Used to power control an adjunct partition |
| DUMP | 0x07 | PHYP | Used to tell an adjunct partition to dump |

The outline command may use a common header format for all commands, e.g., an eight byte correlator field to correlate a buffer, a one byte version field for the version of the command, a one byte command field that identifies the particular command, a two byte subcommand field to identify a subcommand to perform, a four byte length field to identify the length of the command including the header, a four byte response indirect length, and a four byte response indirect address of the buffer describing the response. The outline command response may include a similar header, but including a four byte return code in lieu of response indirect length and address fields.

Each outline command includes one or more subcommands. For example, the CAPABILITIES command includes a single Exchange subcommand used to exchange capabilities between the hypervisor and adjunct partition.

The CONFIG command includes the subcommands identified below in Table IV:

TABLE IV

Config Subcommand Types

| Subcommand Type | Value | Description |
|---|---|---|
| Ready for Configuration | 0x00 | Used to inform PHYP when adjunct partition is ready for configuration |
| Get Adapter Parameters | 0x01 | Used to retrieve number of physical ports for adapter |
| Get Port Parameters | 0x02 | Used to retrieve current parameters of a physical port |
| Get Port Capabilities | 0x03 | Used to retrieve capabilities of a physical port |
| Set Port Parameters | 0x04 | Used to modify port parameters of a physical port |
| Configure SRIOV | 0x05 | Used to notify SRIOV adapter that PHYP wants to configure SRIOV functions |
| Get SRIOV Adapter Parameters | 0x06 | Used to retrieve parameters for SRIOV adapter |
| Get SRIOV Port Parameters | 0x07 | Used to get SRIOV specific port parameters for physical port |
| Set SRIOV Port Parameters | 0x08 | Used to set SRIOV specific port parameters for physical port |
| Get SRIOV Virtual Function Drc List | 0x09 | Used to retrieve SRIOV virtual function DRC indices |
| Configure SRIOV Virtual Function | 0x0A | Used to configure a virtual function for SRIOV adapter |
| Configuration Complete | 0x0B | Used to notify AP that PHYP has finished configuring AP |
| Deconfigure SRIOV Virtual Function | 0x0C | Used to deconfigure previously configured virtual function |
| Get VPD Size | 0x0D | Used to get size of VPD contained in adapter, must be used before Get VPD |
| Get VPD | 0x0E | Used to get VPD for adapter |
| Verify Port Parameters | 0x0F | Used to verify that port parameters are usable with the adapter |
| EEH Event | 0x10 | Used to communicate EEH events between PHYP and AP |
| Get MAC Address | 0x11 | Used to get MAC address for a virtual function |
| NVRAM Data | 0x12 | Used to indicate there is NVRAM data for AP |
| Change MAC ACLs | 0x13 | Used to change MAC ACL for a virtual function |
| Change Vlan IDs | 0x14 | Sent by PHYP to physical function AP to dynamically change Vlan IDs for a virtual function. Also sent by PHYP to virtual function AP to notify of change |

The Get Adapter Parameters subcommand receives as a response a number of physical ports. The Get Port Parameters, Get Port Capabilities and Set Port Parameters subcommands all specify a port number, and receive in response a 128 byte data structure including the physical port parameters. The Set Port Parameters subcommands also provides the data structure in the request. The data structure may include, for example, a four byte port number field, a one byte port type field, a three byte reserved field and 120 bytes of data based on the port type. For example, for a NIC physical port, the port data may include a four byte MTU field, a four byte flags field including flags for external loopback mode, internal loopback mode, promiscuous mode, link active, autonegotiate duplex, full duplex mode, half duplex mode, RX flow control, and TX flow control, a four byte num speeds field for the number of speeds in the speeds array, and a 64 byte speeds array with 4 byte speed values for each speed. For set port parameters, verify port parameters and get port parameters, num speeds=1 and speeds[0] is the desired or current speed for the port.

The Get SRIOV Adapter Parameters subcommand receives as a response a number of virtual functions possible for configuration. The Get SRIOV Port Parameters and Set SRIOV Port Parameters subcommands specify a port number, and receive in response a 128 byte data structure including the physical port parameters. The Set SRIOV Port Parameters subcommand also provides the data structure in the request. The data structure may include, for example, a four byte port number field, a one byte port type field, a three byte reserved field and 120 bytes of data based on the port type. For example, for a NIC physical port, the port data may include a four byte current number virtual functions field for the current number of virtual functions for the port, a four byte max number virtual functions field for the maximum number of virtual functions for the port, a four byte number promiscuous virtual functions field for the number of promiscuous virtual functions for the port and a four byte number diagnostic virtual functions field for the number of diagnostic virtual functions for the port.

The Get SRIOV Virtual Function DRC List subcommand receives as a response a number of DRC indices in the DRC index array, and an array of the DRC indices for the adapter.

The Configure SRIOV Virtual Function subcommand includes a virtual function type and specific data for that type. For example, for a NIC virtual function, the specific data may include a four byte physical port field for the physical port to which the virtual function is assigned, a four byte virtual function DRC field for the virtual function's DRC, a six byte MAC Address field that defines the default MAC address for the virtual function, a two byte flags field that includes flags for promiscuous mode, diagnostic mode, and MAC address restricted, a two byte Logical Partition ID field that specifies the logical partition for the virtual function, a one byte Min Quality of Service field that specifies the minimum quality of service for the virtual function (e.g., a value between 0-100%), a one byte Max Quality of Service field that specifies the max quality of service for the virtual function, a one byte Quality of Service Weight field that specifies the quality of service weight for the virtual function (e.g., a value between 0-100), a one byte Priority Level field for the virtual function (e.g., a value between 0-7), a two byte Number VLAN IDs field that is the number of VLAN IDs in the VLAN ID array (e.g., a maximum of 20), a 40 byte VLAN ID array field that includes a list of two byte VLAN IDs for the virtual function, a two byte Number Allowed MAC Addresses field that is the length of the allowed MAC addresses in the array (e.g., a maximum of 8, although the default MAC address may always be allowed and not listed in the Allowed MAC addresses array), and a 48 byte Allowed MAC addresses array with a list of six byte MAC addresses for the virtual function.

The Deconfigure SRIOV Virtual Function subcommand provides a four byte DRC of a virtual function to deconfigure. The Get VPD Size subcommand receives an eight byte size of the VPD data, and the Get VPD subcommand specifies a four byte indirect length and four bye indirect address for the buffer to which the VPD data should be written.

The EEH Event subcommand communicates EEH events between the hypervisor and an adjunct partition, and includes a four byte target adjunct DRC field with the DRC index of the target adjunct partition, with a zero value included when sent by the hypervisor, and a DRC value for a child adjunct partition when sent by a parent adjunct partition. A one byte event code is also provided, which may define, for example, an EEH occurred event that notifies an adjunct partition to take an EEH action, a suspend event to perform an EEH suspend action, and a reset event to perform an EEH reset action.

The Get MAC Address subcommand is sent by the hypervisor and receives a six byte current MAC address for a virtual function. The NVRAM Data subcommand is sent by the hypervisor to indicate that there is NVRAM data for a target adjunct partition, and specifies an indirect length and address for an I/O mapped address of memory for a dump to be written to.

The Change MAC ACL subcommand is sent by the hypervisor to a physical function adjunct partition to change the MAC ACL for a virtual function, and is also sent by the hypervisor to notify a virtual function adjunct partition of the change. The subcommand specifies an eight byte virtual function DRC, a two byte number of MAC ACLS, and a MAC ACL array of six byte MAC addresses.

The Change VLAN IDs subcommand is sent by the hypervisor to a physical function adjunct partition to dynamically change the VLANs for a virtual function, and is also sent to a virtual function adjunct partition by the hypervisor to notify it of a change. The subcommand specifies an eight byte DRC index of a virtual function to change, a two byte number of VLAN IDs in the array, and a forty byte array of two byte VLAN IDs.

The ERROR_OG command includes subcommands for Error Indication, Retrieve Error Log and Notify Error Log. The Error Indication subcommand is sent by an adjunct partition when a new error log is to be created, and causes the hypervisor to create the error log and return the error log identifier on creation. The adjunct partition provides the hypervisor with a scatter gather list of Platform Error Log Data Descriptors to copy the newly created Platform Error Log into. In the case where the Platform Error Log info cannot be copied into the buffer, a return code of PartialSuccess may be returned, indicating that the data is not present in the buffer. The data can still be attempted to be retrieved via the Retrieve Error Log command.

The Error Indication subcommand may include a 32 byte Primary System Reference Code field for the error log entry, an eight byte Num Extended SRC Words field for the number of values in the Extended SRC Word Array, a 32 byte Extended SRC Word Array field of four byte extend SRC word values, a one byte Severity field, a two byte Flags field with flags for Call Home Required and Only notify owning partition, an eight byte Error Data Descriptor Count field for the number of Error Data Descriptors in the Error Data Descriptor array, a 96 byte Error Data Descriptor array field with an array of Error Data Descriptors, each of which including a four byte error data indirect length and four byte error data indirect address for a TCE-mapped I/O bus address of a buffer containing the error data, an eight byte Platform Error Log Data Descriptor Count field with the number of Error Data Descriptors in the Platform Error Log Data Descriptor Array, and a 24 byte Platform Error Log Data Descriptor Array field with an array of Error Data Descriptors that are provided by an adjunct partition to the hypervisor in order to copy in the newly created Platform Error Log. The response to an Error Indication subcommand may include a four byte Error Log Identifier, used by the Retrieve Error Log subcommand and a four byte Error Log Size.

The Retrieve Error Log subcommand specifies a four byte Error Log Identifier, as well as a four byte Error Log Data indirect length and four byte Error Log Data indirect address for the TCE-mapped I/O bus address of the location for the error log data. The Notify Error Log subcommand is used to notify an adjunct partition of an error log that occurred, and specifies a four byte target adjunct DRC index of the target adjunct partition (if sent by the hypervisor, a value of zero, and if sent by a parent adjunct partition, the DRC index of the child adjunct partition), a four byte error log identifier, a four byte error log size, and a two byte cause of the error log.

The TRACE command includes Request Number Components, Request Components, Control Trace and Collect Trace subcommands. The Request Number Components subcommand receives a four byte number of components whose trace characteristics can be individually modified, and the Request Components subcommand receives a list of components that can be modified, as well as a one byte field with the number of components in the list.

A firmware component data structure may include a 48 byte component name field with an ASCII string of a component name, a four byte field with the size of the trace buffer, a one byte correlator for the component, a one byte trace level, a one byte parent correlator for the parent component, a one byte error checking field with the error checking level of the component (e.g., between 0 and 9, or 0xFF if the component does not support error checking), a one byte trace state field indicating whether tracing is on, and a 192 byte field with an ASCII string with a readable description of the component.

The Control Trace subcommand controls the tracing levels for a specified component, and specifies a one byte correlator for the specified component, a one byte operation (e.g., modify level of tracing, modify level of error checking, suspend tracing, resume tracing, turn the trace on, turn the trace off, or change the size of the trace buffer), a one byte level field between 0 and 9 (where a large number indicates a higher level of tracing or error checking), and a four byte trace buffer size field.

The Collect Trace subcommand is used by the hypervisor to collect a trace for a given component, and specifies a one byte correlator. The Collect Trace subcommand response returns a four byte number of trace entries and a variable length array of trace entries. A trace entry may include a four byte trace ID, a one byte number of valid trace data, an eight byte PMC register field, an eight byte time base field, and 5 eight byte trace data fields.

The STATISTICS command is used to collect statistics about a virtualized adapter being used in an adjunct partition, and includes Clear and Retrieve subcommands. The Clear subcommand specifies a one byte statistics set and clears the statistics for a given port or virtual function. The Retrieve subcommand specifies the one byte statistics set, and seven bytes of specific data. For example, for a NIC statistic set, the specific data may include a one byte statistics group and a four byte identifier, e.g., either a physical port number or a virtual function DRC, depending on the statistics group. The response may include a 256 byte set of statistics, which may include a four byte version field, a four byte promiscuous field, and eight byte fields for received packets, bytes received, packets sent, bytes sent, unicast packets sent, unicast packets received, multicast packets sent, multicast packets received, broadcast packets sent, broadcast packets received, alignment errors, fcs errors, single collision frames, multiple collision frames, sqe test errors, deferred transmissions, late collisions, excess collisions, internal mac transmit errors, carrier sense, too long frames, internal mac receive errors, received packets<=64 bytes, received packets<=128 bytes, received packets<=256 bytes, received packets<=512 bytes, received packets<=1024 bytes, transmit packets<=64 bytes, transmit packets<=128 bytes, transmit packets<=256 bytes, transmit packets<=512 bytes, transmit packets<=1024 bytes, no receive buffers, receive runt frames, receive symbol errors, receive overrun errors, received pause frames, receive filter drops, transmit local faults, transmit remote faults, and transmitted pause frames.

The POWER_CONTROL command includes Power Off, Notify Bootable, Reboot and Power State subcommands. The Power Off subcommand informs an adjunct partition that it is being powered off. The Notify Bootable subcommand is used by a parent adjunct partition to notify the hypervisor that a child adjunct partition is bootable, and specifies a four byte DRC index of a child adjunct partition and a four byte bootable field that specifies whether the child adjunct partition is bootable. The Reboot subcommand is sent by a parent adjunct partition to a child adjunct partition to reboot that child adjunct partition, and specifies the DRC index of the child adjunct partition. The Power State subcommand is sent by the hypervisor to inform a parent adjunct partition of a child adjunct partition's power state, and specifies the DRC index of the child adjunct partition and the power state of the child adjunct partition.

The DUMP command includes a Request Dump subcommand that requests an adjunct partition to perform a dump. If sent by the hypervisor, no target adjunct partition DRC index is specified, and if sent by a parent adjunct partition, a four byte DRC index of a child adjunct partition is specified.

It will be appreciated that the specific commands utilized in the AMC protocol, as well as the assignment of fields to such commands or to buffers utilized to transmit data between a hypervisor and an adjunct partition, may vary in different embodiments. Moreover, implementation of such a protocol in a logically partitioned data processing system would be within the abilities of one of ordinary skill in the art having the benefit of the instant disclosure.

In operation, and with reference to FIG. 6, the AMC protocol may be used to configure an SRIOV adapter in the following exemplary manner. If, for example, an administrator desires to put an adapter into SRIOV mode, the administrator uses HMC 612 to retrieve a list of adapters that are capable of being put into SRIOV mode. The administrator then selects an adapter and activates SRIOV mode, which causes the HMC to send a command to the Hypervisor Configuration Manager (HCM) 624. HCM 624 then creates a physical function adjunct partition 616 with an AMC adapter device driver 626, along with an AMC adapter device driver 628 in hypervisor 606. The ownership of the I/O slot is then assigned to the physical function adjunct partition 616. HCM 624 will then automatically boot the physical function adjunct partition 616. Adjunct partition 616 is passed in partition configuration parameters identifying what IO it owns. The adjunct boot code will then bring up the IO device in SRIOV mode. HMC 612 can then perform queries about more specific SRIOV capabilities by sending commands to HCM 624, which passes on the requests to adjunct partition 616 via the AMC channel 630. The response will be given back to HCM 624 and passed back up to HMC 612.

When the administrator desires to configure a virtual function on the SRIOV adapter, the administrator selects a virtual function to configure in HMC 612, along with an LPAR and virtual slot on that LPAR that the virtual function will be connected to via VNIC. Other options may also be configured with the VNIC, such as MAC address, VLAN information, and other configuration options. Upon configuration of the virtual function, HMC 612 sends the configuration information to HCM 624, which will do a sanity check of the information (e.g., to make sure the VIO slot for the VNIC is available, that the virtual function isn't configured elsewhere, etc), and will then create the virtual function adjunct partition 614 along with AMC device drivers 632, 634 in both the virtual function adjunct partition 614 and hypervisor 606. A client virtual NIC device driver is then configured for the LPAR 602 that is paired with a server virtual NIC device driver in adjunct partition 614 (see the aforementioned '316 application), and when the client virtual NIC device driver in LPAR 602 is "varied on" as a result of partition boot or a DLPAR add, virtual function adjunct partition 614 powers on. The SRIOV adapter is then ready to communicate in SRIOV mode.

Although embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method of managing a self-virtualizing input/output (IO) resource in a logically partitioned data processing system comprising a plurality of logical partitions, the method comprising:
    interfacing an adjunct partition associated with the self-virtualizing input/output (IO) resource with a hypervisor through a vendor-independent Adjunct Management Channel (AMC) interface,
    wherein the adjunct partition includes a partition AMC device driver and the hypervisor includes a hypervisor AMC device driver configured to interface with the partition AMC device driver over the AMC interface, and wherein the AMC interface comprises a virtual interface implemented using paired virtual adapters resident respectively in the adjunct partition and the hypervisor; and
    in the hypervisor, managing the adjunct partition by communicating a configuration command from the hypervisor to vendor-specific adjunct management program code in the adjunct partition over the AMC interface using the partition AMC device driver and the hypervisor AMC device driver to enable the adjunct partition to configure the self-virtualizing IO resource for access by the plurality of logical partitions or to allow access to the self-virtualizing IO resource by at least one of the plurality of logical partitions,
    wherein the adjunct partition includes a separate dispatchable state and employs virtual address space donated from a logical partition in the plurality of logical partitions or the hypervisor of the data processing system.

2. The method of claim 1, wherein the adjunct partition comprises a physical function adjunct partition in communication with a physical function of the self-virtualizing IO resource, the method further comprising:
    interfacing the hypervisor with a virtual function adjunct partition associated with a virtual function of the self-virtualizing IO resource through the AMC interface, the hypervisor and the virtual function adjunct partition respectively including second hypervisor and partition AMC device drivers configured to interface with one another over the AMC interface; and
    in the hypervisor, managing the virtual function adjunct partition by communicating a configuration command from the hypervisor to vendor-specific adjunct management program code in the virtual function adjunct partition over the AMC interface using the second hypervisor and partition AMC device drivers.

3. The method of claim 1, wherein the adjunct partition is a physical function adjunct partition, and wherein the adjunct partition includes a physical function device driver in communication with a physical function of the self-virtualizing IO resource.

4. The method of claim 3, further comprising:
    in the hypervisor, managing the self-virtualizing IO resource by communicating a configuration command from the hypervisor to the physical function adjunct partition through the AMC interface; and
    in the physical function adjunct partition, and in response to the configuration command, sending a command to the physical function of the self-virtualizing IO resource using the physical function device driver.

5. The method of claim 3, further comprising interfacing the partition AMC device driver with the physical function device driver through a device driver application programming interface (API).

6. The method of claim 3, further comprising:
    interfacing the hypervisor with a virtual function adjunct partition associated with a virtual function of the self-virtualizing IO resource through the AMC interface, the hypervisor and the virtual function adjunct partition respectively including second hypervisor and partition AMC device drivers configured to interface with one another over the AMC interface; and
    in the hypervisor, managing the virtual function adjunct partition by communicating a configuration command from the hypervisor to vendor-specific adjunct management program code in the virtual function adjunct partition over the AMC interface using the second hypervisor and partition AMC device drivers.

7. The method of claim 6, further comprising:
    in the physical function adjunct partition, notifying the hypervisor that the physical function adjunct partition is ready for configuration via the AMC interface;
    in the hypervisor, requesting adapter parameters for the self-virtualizing IO resource from the physical function adjunct partition via the AMC interface;
    in the physical function adjunct partition, returning requested adapter parameters for the self-virtualizing IO resource to the hypervisor via the AMC interface;
    in the hypervisor, requesting port parameters for the self-virtualizing IO resource from the physical function adjunct partition via the AMC interface;
    in the physical function adjunct partition, returning requested port parameters for the self-virtualizing IO resource to the hypervisor via the AMC interface;
    in the hypervisor, instructing the physical function adjunct partition to configure at least one physical port of the self-virtualizing IO resource via the AMC interface; and
    in the hypervisor, configuring at least one virtual function for the self-virtualizing resource, including:
        setting port parameters for the self-virtualizing IO resource to control a number of virtual functions for at least one physical port of the self-virtualizing IO resource via the AMC interface; and
        configuring the virtual function via the AMC interface.

8. The method of claim 1, further comprising, in the hypervisor, powering off the adjunct partition via the AMC interface.

9. The method of claim 1, wherein the adjunct partition is a parent adjunct partition, the method further comprising, in the parent adjunct partition, instructing a child adjunct partition to reboot via the AMC interface.

10. The method of claim 1, wherein the adjunct partition is a parent adjunct partition, the method further comprising, in the parent adjunct partition, notifying the hypervisor whether a child adjunct partition is bootable via the AMC interface.

11. The method of claim 1, wherein the adjunct partition is a parent adjunct partition, the method further comprising, in the hypervisor, notifying the parent adjunct partition of a power state of a child adjunct partition via the AMC interface.

12. The method of claim 1, further comprising creating an error log, including:
- in the adjunct partition, notifying the hypervisor to create an error log via the AMC interface;
- in the hypervisor, creating the error log and returning an error log identifier to the adjunct partition via the AMC interface;
- in the adjunct partition, sending a buffer identifier to the hypervisor via the AMC interface; and
- in the hypervisor, retrieving the error log and copying the error log to a buffer identified by the buffer identifier.

13. The method of claim 1, wherein the self-virtualizing IO resource comprises an SRIOV Ethernet adapter.

14. An apparatus, comprising:
- at least one processor; and
- program code configured upon execution by the at least one processor to manage a self-virtualizing input/output (IO) resource in a logically partitioned data processing system comprising a plurality of logical partitions by
- interfacing an adjunct partition associated with the self-virtualizing input/output (IO) resource with a hypervisor through a vendor-independent Adjunct Management Channel (AMC) interface,
- wherein the adjunct partition includes a partition AMC device driver and the hypervisor includes a hypervisor AMC device driver configured to interface with the partition AMC device driver over the AMC interface, and wherein the AMC interface comprises a virtual interface implemented using paired virtual adapters resident respectively in the adjunct partition and the hypervisor; and
- in the hypervisor, managing the adjunct partition by communicating a configuration command from the hypervisor to vendor-specific adjunct management program code in the adjunct partition over the AMC interface using the partition AMC device driver and the hypervisor AMC device driver to enable the adjunct partition to configure the self-virtualizing IO resource for access by the plurality of logical partitions or to allow access to the self-virtualizing IO resource by at least one of the plurality of logical partitions,
- wherein the adjunct partition includes a separate dispatchable state and employs virtual address space donated from a logical partition in the plurality of logical partitions or the hypervisor of the data processing system.

15. The apparatus of claim 14, wherein the adjunct partition comprises a physical function adjunct partition in communication with a physical function of the self-virtualizing IO resource, and wherein the program code is further configured to:
- interface the hypervisor with a virtual function adjunct partition associated with a virtual function of the self-virtualizing IO resource through the AMC interface, the hypervisor and the virtual function adjunct partition respectively including second hypervisor and partition AMC device drivers configured to interface with one another over the AMC interface; and
- in the hypervisor, manage the virtual function adjunct partition by communicating a configuration command from the hypervisor to vendor-specific adjunct management program code in the virtual function adjunct partition over the AMC interface using the second hypervisor and partition AMC device drivers.

16. The apparatus of claim 14, wherein the adjunct partition is a physical function adjunct partition, and wherein the adjunct partition includes a physical function device driver in communication with a physical function of the self-virtualizing IO resource.

17. The apparatus of claim 16, the program code is further configured to:
- in the hypervisor, manage the self-virtualizing IO resource by communicating a configuration command from the hypervisor to the physical function adjunct partition through the AMC interface; and
- in the physical function adjunct partition, and in response to the configuration command, send a command to the physical function of the self-virtualizing IO resource using the physical function device driver.

18. The apparatus of claim 16, wherein the program code is further configured to:
- interface the hypervisor with a virtual function adjunct partition associated with a virtual function of the self-virtualizing IO resource through the AMC interface, the hypervisor and the virtual function adjunct partition respectively including second hypervisor and partition AMC device drivers configured to interface with one another over the AMC interface; and
- in the hypervisor, manage the virtual function adjunct partition by communicating a configuration command from the hypervisor to vendor-specific adjunct management program code in the virtual function adjunct partition over the AMC interface using the second hypervisor and partition AMC device drivers.

19. The apparatus of claim 18, wherein the program code is further configured to:
- in the physical function adjunct partition, notify the hypervisor that the physical function adjunct partition is ready for configuration via the AMC interface;
- in the hypervisor, request adapter parameters for the self-virtualizing IO resource from the physical function adjunct partition via the AMC interface;
- in the physical function adjunct partition, return requested adapter parameters for the self-virtualizing IO resource to the hypervisor via the AMC interface;
- in the hypervisor, request port parameters for the self-virtualizing IO resource from the physical function adjunct partition via the AMC interface;
- in the physical function adjunct partition, return requested port parameters for the self-virtualizing IO resource to the hypervisor via the AMC interface;
- in the hypervisor, instruct the physical function adjunct partition to configure at least one physical port of the self-virtualizing IO resource via the AMC interface; and
- in the hypervisor, configure at least one virtual function for the self-virtualizing resource by:
  - setting port parameters for the self-virtualizing IO resource to control a number of virtual functions for at least one physical port of the self-virtualizing IO resource via the AMC interface; and
  - configuring the virtual function via the AMC interface.

20. The apparatus of claim 14, wherein the program code is further configured to, in the hypervisor, power off the adjunct partition via the AMC interface.

21. The apparatus of claim 14, wherein the adjunct partition is a parent adjunct partition, and wherein the program code is further configured to, in the parent adjunct partition, instruct a child adjunct partition to reboot via the AMC interface, and notify the hypervisor whether a child adjunct partition is bootable via the AMC interface.

22. The apparatus of claim 14, wherein the adjunct partition is a parent adjunct partition, and wherein the program code is further configured to, in the hypervisor, notify the parent adjunct partition of a power state of a child adjunct partition via the AMC interface.

23. The apparatus of claim 14, wherein the program code is further configured to create an error log by:
   in the adjunct partition, notifying the hypervisor to create an error log via the AMC interface;
   in the hypervisor, creating the error log and returning an error log identifier to the adjunct partition via the AMC interface;
   in the adjunct partition, sending a buffer identifier to the hypervisor via the AMC interface; and
   in the hypervisor, retrieving the error log and copying the error log to a buffer identified by the buffer identifier.

24. A program product, comprising:
   a non-transitory computer readable medium; and
   program code stored on the non-transitory computer readable medium and configured upon execution to manage a self-virtualizing input/output (IO) resource in a logically partitioned data processing system comprising a plurality of logical partitions by:
      interfacing an adjunct partition associated with the self-virtualizing input/output (IO) resource with a hypervisor through a vendor-independent Adjunct Management Channel (AMC) interface,
   wherein the adjunct partition includes a partition AMC device driver and the hypervisor includes a hypervisor AMC device driver configured to interface with the partition AMC device driver over the AMC interface, and wherein the AMC interface comprises a virtual interface implemented using paired virtual adapters resident respectively in the adjunct partition and the hypervisor; and
   in the hypervisor, managing the adjunct partition by communicating a configuration command from the hypervisor to vendor-specific adjunct management program code in the adjunct partition over the AMC interface using the partition AMC device driver and the hypervisor AMC device driver to enable the adjunct partition to configure the self-virtualizing IO resource for access by the plurality of logical partitions or to allow access to the self-virtualizing IO resource by at least one of the plurality of logical partitions,
   wherein the adjunct partition includes a separate dispatchable state and employs virtual address space donated from a logical partition in the plurality of logical partitions or the hypervisor of the data processing system.

* * * * *